(12) United States Patent
Maurer et al.

(10) Patent No.: US 12,419,298 B2
(45) Date of Patent: Sep. 23, 2025

(54) PARAMETER SENSING FOR A LIQUID APPLICATOR

(71) Applicant: INTELLIGENT AGRICULTURAL SOLUTIONS LLC, Fargo, ND (US)

(72) Inventors: Garrett Maurer, Moorhead, MN (US); Daniel R. Wood, Jr., Fargo, ND (US)

(73) Assignee: PRECISION PLANTING LLC, Tremont, IL (US)

( * ) Notice: Subject to any disclaimer, the term of this patent is extended or adjusted under 35 U.S.C. 154(b) by 236 days.

(21) Appl. No.: 17/754,514

(22) PCT Filed: Oct. 2, 2020

(86) PCT No.: PCT/US2020/053993
§ 371 (c)(1),
(2) Date: Apr. 4, 2022

(87) PCT Pub. No.: WO2021/067739
PCT Pub. Date: Apr. 8, 2021

(65) Prior Publication Data
US 2024/0099288 A1    Mar. 28, 2024

Related U.S. Application Data

(60) Provisional application No. 62/910,714, filed on Oct. 4, 2019.

(51) Int. Cl.
*A01M 7/00* (2006.01)
*A01C 23/00* (2006.01)
(Continued)

(52) U.S. Cl.
CPC ......... *A01M 7/0089* (2013.01); *A01C 23/007* (2013.01); *A01C 23/047* (2013.01);
(Continued)

(58) Field of Classification Search
CPC . A01M 7/0089; A01M 7/0042; A01C 23/007; A01C 23/047; B05B 12/008;
(Continued)

(56) References Cited

U.S. PATENT DOCUMENTS

| 5,911,362 A | 6/1999 | Wood et al. | |
|---|---|---|---|
| 2009/0112372 A1* | 4/2009 | Peterson | A01M 7/0089 700/283 |
| 2017/0036228 A1* | 2/2017 | Thurow | A01M 7/0042 |

FOREIGN PATENT DOCUMENTS

| CA | 2 139 891 A1 | 7/1995 |
|---|---|---|
| CN | 106 614 473 A | 5/2017 |

(Continued)

OTHER PUBLICATIONS

UK Intellectual Property Office, Search report for related UK Application No. GB2004416.0, dated Aug. 21, 2020.
(Continued)

*Primary Examiner* — Robert R Raevis

(57) ABSTRACT

A parameter sensor for an agricultural sprayer is mounted to an applicator and configured to determine liquid parameters of the liquid flowing through the spray nozzle. The parameter sensing module includes one or both of a flow meter and a pressure sensor. The parameter sensor includes sensor circuitry configured to determine a flow rate based on data generated by the flow meter and determine a liquid pressure based on data generated by the pressure sensor.

14 Claims, 8 Drawing Sheets

(51) Int. Cl.
*A01C 23/04* (2006.01)
*B05B 12/00* (2018.01)
*B05B 12/06* (2006.01)

(52) U.S. Cl.
CPC ......... *A01M 7/0042* (2013.01); *B05B 12/008* (2013.01); *B05B 12/06* (2013.01)

(58) Field of Classification Search
CPC ......... B05B 12/06; B05B 15/18; B05B 1/083; B05B 1/1645; B05B 15/50; B05B 15/658
USPC ........ 73/1.35, 37, 861.32, 861.351, 861.352, 73/195, 198, 861.71, 861, 72, 706, 714; 239/71, 72, 74, 146–176; 47/48.5
See application file for complete search history.

(56) References Cited

FOREIGN PATENT DOCUMENTS

| | | | |
|---|---|---|---|
| CN | 108338150 A | * | 7/2018 |
| CN | 110741797 A | | 2/2020 |
| KR | 101232613 B1 | * | 2/2023 |
| RU | 2706490 C | | 11/2019 |
| WO | 2017/223252 A | | 12/2017 |
| WO | 2019/027771 A1 | | 2/2019 |

OTHER PUBLICATIONS

European Patent Office, International Search Report related to International Patent Application No. PCT/US2020/053993, mail date May 7, 2021.

* cited by examiner

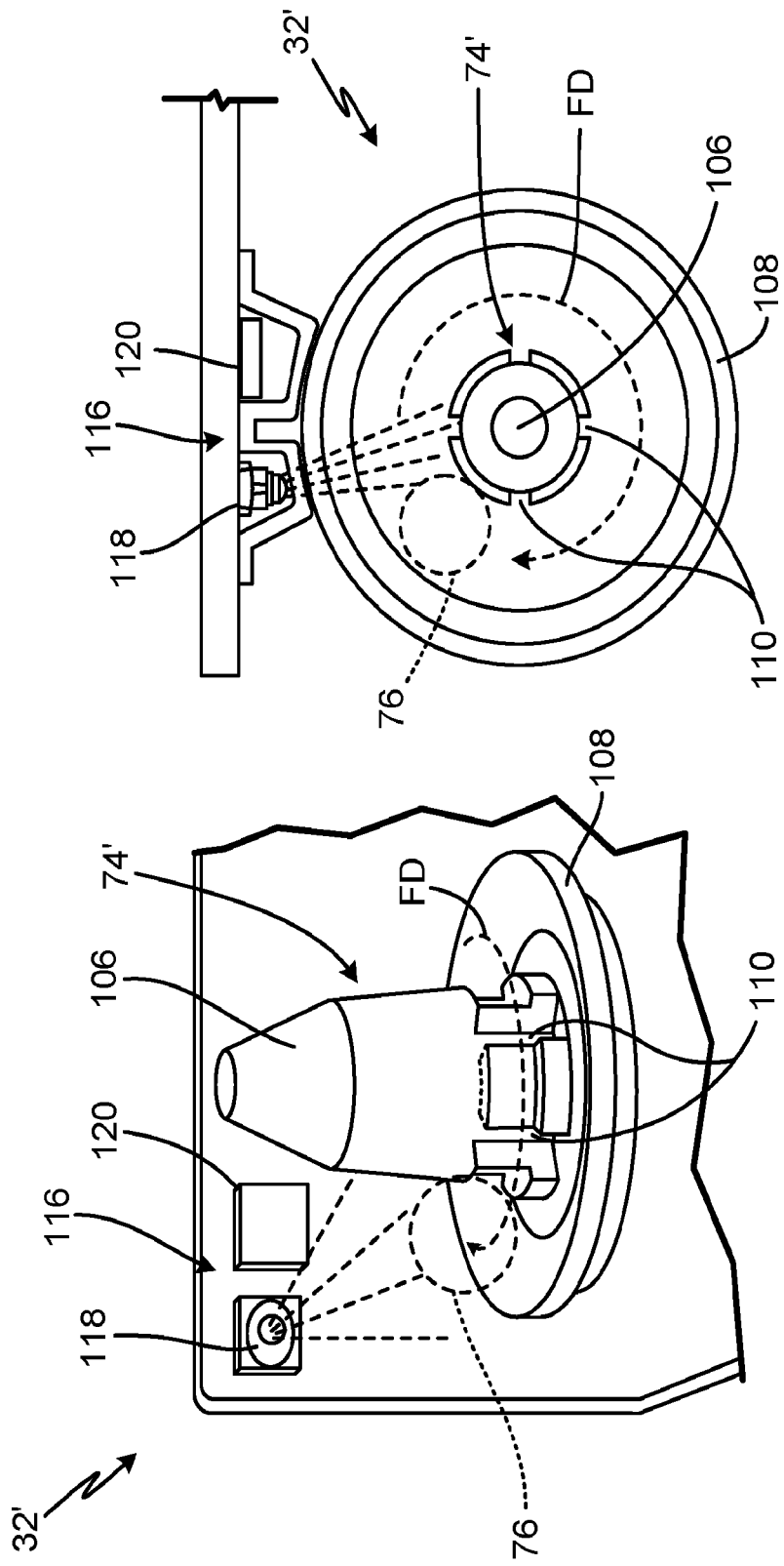

PARAMETER SENSING FOR A LIQUID APPLICATOR

CROSS-REFERENCE TO RELATED APPLICATIONS

This application is a national phase entry under 35 U.S.C. § 371 of International Patent Application PCT/US2020/053993, filed Oct. 2, 2020, designating the United States of America and published in English as International Patent Publication WO 2021/067739 A2 on Apr. 8, 2021, which claims the benefit of U.S. Provisional Application No. 62/910,714 filed Oct. 4, 2019, "PARAMETER SENSING FOR A LIQUID APPLICATOR," the disclosures of which are hereby incorporated by reference in their entireties.

BACKGROUND

This disclosure relates generally to liquid applicators. More particularly, this disclosure relates to functional monitoring of applicators for use in agricultural spraying systems.

Agricultural sprayers emit liquid sprays for application in fields. The sprayers emit the liquid through an applicator, which can include a spray nozzle or can discharge the liquid to the atmosphere without inclusion of nozzles in the flow path. The configuration without the inclusion of nozzles is also known as open-end discharge and, for example, practiced in the field application of liquid fertilizer.

Spray nozzles emit liquid sprays for application on various surfaces. Spray nozzles emit the liquid through a spray orifice. The spray characteristics of the liquid spray, such as the shape of the fan and the size of the droplets, vary based on the flow characteristics of the liquid, such as flow rate and pressure. Spray nozzles can include internal valving to control the liquid flow to the spray orifice. For example, the spray nozzles may include check valves that are configured to close when the upstream pressure drops below a threshold, thereby preventing leakage and dripping when the system is depressurized. In some cases, the internal valving includes pulse width modulated (PWM) valves that cycle open and closed to control flow rate. The PWM valve cycling between an open and a closed state generates turbulence in the liquid flow through the nozzle.

Multiple spray nozzles are often connected to the same boom section to receive the spray fluid. The pressure within the spray boom varies across the width of the boom due to head loss across the width of the boom. As such, the pressure actually experienced at a spray nozzle may vary from the expected pressure at that nozzle. Such pressure variations can lead to over-application or under-application of the spray liquid.

In the course of extended use nozzles will wear, become partially clogged, or fully blocked. Worn nozzles are a root cause of ineffective spraying, leading to insufficient crop protection and economic loss.

BRIEF SUMMARY

According to one aspect of the disclosure, a nozzle for an agricultural sprayer includes a nozzle body configured to receive fluid from a pressurized boom; a spray tip fluidly connected to the nozzle body, the spray tip configured to generate a liquid spray; a parameter sensing module fluidly connected to the nozzle body; and a pulse width modulated (PWM) valve supported by the nozzle body and disposed in the flow path between the boom and the spray orifice, the PWM valve configured to pulse between an open state and a closed state. The parameter sensing module includes a flow meter and a pressure sensor.

According to another aspect of the disclosure, an agricultural sprayer includes a material supply configured to store a supply of spray liquid; a boom fluidly connected to the material supply and extending from the sprayer; a plurality of nozzles spaced along the boom; and a controller. A first one of the plurality of nozzles includes a nozzle body attached to the boom to receive the spray liquid from the boom; a spray tip fluidly connected to the nozzle body, the spray tip configured to generate a liquid spray; a parameter sensing module fluidly connected to the nozzle body; and a pulse width modulated (PWM) valve supported by the nozzle body and disposed in the flow path between the boom and the spray orifice. The PWM valve is configured to pulse between an open state and a closed state. The parameter sensing module includes a flow meter configured to generate flow data and a pressure sensor configured to generate pressure data. The controller is operatively connected to the parameter sensing module and the PWM valve. The controller is configured to receive parameter data generated by parameter sensing module, to determine a parameter status of the liquid flowing through nozzle based on the parameter data, and to control a duty cycle of the PWM valve based on the parameter data.

BRIEF DESCRIPTION OF THE DRAWINGS

FIG. 6A is an isometric view showing a portion of a flow meter.

FIG. 6B is a plan view showing a portion of a flow meter.

DETAILED DESCRIPTION

Figure 1:
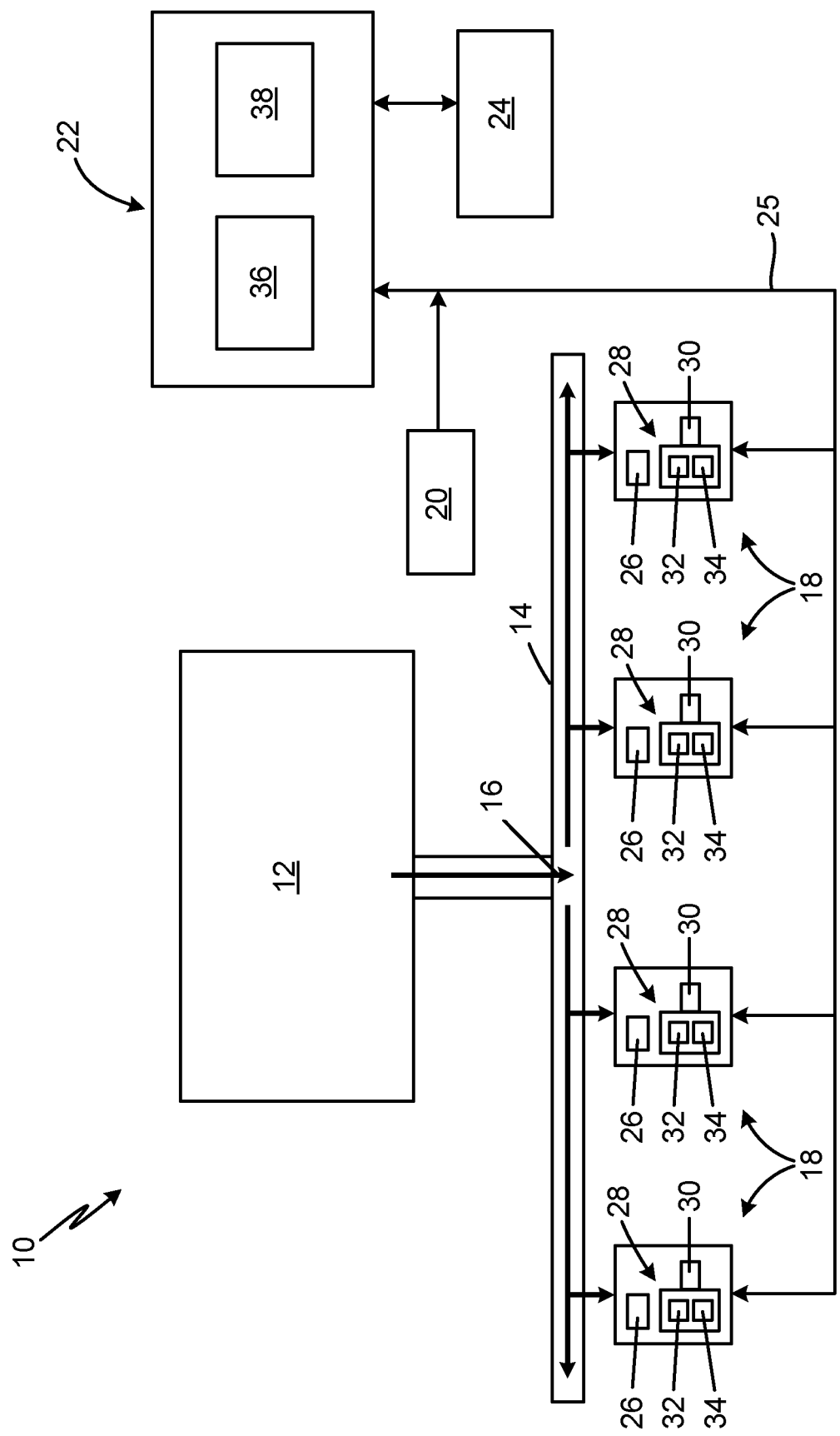
FIG. 1 is a block schematic diagram of a spray system.

FIG. 1 is a block schematic diagram of spray system 10. Spray system 10 includes supply tank 12, boom(s) 14, distribution lines 16, applicators 18, system sensors 20, control module 22, user interface 24, and bus 25. Each applicator 18 includes valve 26 and parameter sensor 28. Parameter sensor 28 includes sensor circuitry 30, flow meter 32, and pressure sensor 34. Control module 22 includes control circuitry 36 and memory 38.

Spray system 10 is configured to apply liquid sprays onto a target surface via applicators 18. In some examples, applicators 18 are nozzles configured to generate a liquid spray. In other examples, applicators 18 eject the liquid directly to atmosphere for application on the surface. For example, spray system 10 can be configured as part of an agricultural spraying system configured to apply liquid sprays to fields. Spray system 10 can be configured to apply herbicides, pesticides, fungicides, and liquid fertilizers, among other options. System sensors 20 are configured to generate data regarding spray system 10 during operation. For example, system sensors 20 can be configured to generate any one or more of geo-positioning data, ground speed data, and wheel deflection data, among other types of data.

Spray system 10 includes a vehicle configured to traverse a surface that the spray is applied to. The vehicle supports and/or drives various other components of spray system 10. Supply tank 12 stores a supply of liquid for spraying. In some examples, spray system 10 can be integrated into a self-propelled agricultural sprayer. In other examples, spray system 10 can be attached to and towed by another agricultural implement. While spray system 10 is described as implemented in an agricultural sprayer, it is understood that spray system 10 can be operated according to the techniques described herein in multiple environments and across a variety of applications.

Supply tank 12 can be mounted to a frame and/or supported by a surface. In the example shown, supply tank 12 is mounted on a vehicle. For example, the vehicle can be an agricultural spraying implement and supply tank 12 can be mounted to the frame of the agricultural spraying implement. In another example, the vehicle can be a truck or other similar vehicle and supply tank can be supported by the bed of the truck or other vehicle. Supply tank 12 can, in some examples, be mounted on a separate component towed or otherwise propelled by the main vehicle. Booms 14 extend laterally relative to a travel direction of the vehicle. Distribution lines 16 are fluidly connected to supply tank 12 to receive liquid from supply tank 12. Supply tank 12 is configured to house the liquid for distribution to distribution lines 16. Applicators 18 receive the liquid from distribution lines 16 and to expel the liquid. In examples where applicators 18 are nozzles, the nozzles can be mounted directly to the boom 14 or distribution line 16. Spray system 10 can include a motive device of any desired configuration for driving the liquid through distribution lines 16. For example, supply tank 12 can be pressurized and/or a pump can be disposed to pump the liquid from supply tank 12 through distribution lines 16 to applicators 18.

Distribution lines 16 can be of any configuration suitable for conveying the liquid from supply tank 12 to applicators 18. Distribution lines 16 can be tubular supply manifolds that project from an agricultural spraying implement. Distribution lines 16 can be supported by booms 14 that project laterally from the implement relative to a direction of travel of the implement. In some examples, distribution lines 16 and booms 14 are formed by the same component. As such, the boom can both extend from the implement and can define the flowpaths providing the liquid to the applicators 18. In some examples, multiple applicators 18 can be connected to a common distribution line 16 such that the distribution line 16 feeds each of the multiple applicators 18. In other examples, distribution lines 16 can include multiple individual flow tubes extending to applicators 18. In one example, spray system 10 can include the same number of flow tubes as applicators 18. Applicators 18 are configured to eject the liquid received from distribution lines 16.

The liquid is ejected at applicators 18 for application on the target surface, such as application in a field. In examples where applicators 18 are nozzles, applicators 18 can be individually controlled by control module 22 to apply the liquid spray according to a desired application protocol. The application protocol sets the desired application rate. In some examples, the application protocol can call for different application rates at different applicators 18. In some examples, each applicator 18 is controlled according to an individual application rate, such that each applicator 18 can be independently controlled. The distribution lines 16 providing liquid to applicators 18 are pressurized to a boom pressure. That boom pressure drives the liquid through applicators 18.

In one example, applicators 18 include a valve 26 operatively connected to applicator 18. Valve 26 can be an actively controlled valve or a passive valve. For example, valve 26 can be a pulse width modulated (PWM) valve. As such, valve 26 can be configured to reciprocate between an open state and a closed state according to a desired frequency and duty cycle to control liquid flow through applicator 18. In examples where valve 26 is actively controlled, valve 26 provides the user control over the flow rate through each applicator 18. The duty cycle of valve 26 is controlled to control the flow rate of the liquid through applicator 18. Pulsing valve 26 between open and closed affects the flow rate, but the spray pattern and droplet size generated by applicator 18 is unaffected so applicator 18 generates a liquid spray having the desired pattern and droplet size. In other examples, valve 26 can be a passive pressure-activated check valve. The check valve is configured to close when the boom pressure drops below a threshold to prevent the liquid from leaking through applicator 18. While applicators 18 are described as including valves 26, it is understood that applicators 18 do not include valves 26 in some examples.

Parameter sensor 28 is operatively connected to applicator 18. Parameter sensor 28 is disposed in-line with the liquid flow through applicator 18. Parameter sensor 28 is configured to generate data regarding the liquid flowing through applicator 18. Parameter sensor 28 can also determine a parameter value, such as flow rate or pressure level, within its associated applicator 18 based on the sensed data. Flow meter 32 and pressure sensor 34 generate parameter data. Sensor circuitry 30 is configured to determine the parameter value based on the parameter data generated by parameter sensor 28. Parameter sensor 28 can communicate parameter information, including the parameter values, to the user via user interface 24. Parameter sensor 28 can also communicate the parameter information to control module 22. In some examples, control module 22 can control operation of valve 26, thereby controlling the application rate by applicator 18, based on the determined parameter value.

Flow meter 32 forms a sensing component of parameter sensor 28. Flow meter 32 is configured to generate flow data regarding the flow rate of the liquid through applicator 18. Sensor circuitry 30 receives the flow data from flow meter 32 and can determine the flow rate based on that flow data. In some examples, flow meter 32 is a cyclonic flow meter, as discussed in more detail below.

Pressure sensor 34 forms another sensing component of parameter sensor 28. Pressure sensor 34 is configured to generate pressure data regarding the liquid flow through applicator 18. Sensor circuitry 30 receives the pressure data from pressure sensor 34 and can determine the liquid pressure based on that pressure data. Pressure sensor 34 can be of any desired configuration for sensing the fluid pressure within applicator 18, such as a piezo-resistive sensor, a piezoelectric sensor, or of any other type suitable for generating data regarding the applicator pressure. In some examples, pressure sensor 34 includes a diaphragm, such as a stainless steel diaphragm, associated with a pressure port in applicator 18. The diaphragm flexes based on the fluid pressure at the pressure port. The degree to which the diaphragm flexes exerts a force on the pressure sensor component, causing a reaction in the component that can be measured to determine the pressure level.

Parameter sensor 28 can be disposed at any desired location within applicator 18. For example, parameter sensor 28 can be located upstream or downstream of valve 26, in examples where applicator 18 includes valve 26. Flow meter 32 and pressure sensor 34 can be disposed in any desired manner within parameter sensor 28. For example, pressure sensor 34 can be located upstream or downstream of flow meter 32. In examples where parameter sensor 28 includes valve 26, pressure sensor 34 and flow meter 32 can be disposed in any desired configuration relative to valve 26. For example, pressure sensor 34 can be located upstream of flow meter 32 and valve 26, intermediate flow meter 32 and valve 26, or downstream of both flow meter 32 and valve 26.

Sensor circuitry 30 is integrated into parameter sensor 28. Sensor circuitry 30 can be of any desired configuration for determining and generating the parameter information and can include control circuitry and memory. For example, sensor circuitry 30 can include a microprocessor, a controller, a digital signal processor (DSP), an application specific integrated circuit (ASIC), a field-programmable gate array (FPGA), or other equivalent discrete or integrated logic circuitry. Sensor circuitry 30 can be of any type suitable for operating in accordance with the techniques described herein.

Control module 22 can be configured to generate and provide spray commands to applicators 18 to cause applicators 18 to emit liquid sprays according to a desired application protocol. Control module 22 can be further configured to receive parameter information from parameter sensor 28 and communicate that parameter information to the user via user interface 24 or store that parameter information in memory 38 for tracking. In some examples, control module 22 is configured to determine a status of applicator 18, such as whether applicator 18 is operating normally or abnormally, and is further configured to generate an applicator status based on that status determination.

Control module 22 is communicatively connected to various components of spray system 10. Control module 22 can be of any suitable configuration for controlling operation of components of spray system 10, gathering data, processing data, etc. For example, control module 22 can generate spray commands, send the spray commands to applicators 18, receive data from applicators 18 and/or parameter sensors 28, and determine the status of each applicator 18. As such, control module 22 can be of any type suitable for operating in accordance with the techniques described herein. In some examples, control module 22 can be implemented as a plurality of discrete circuitry subassemblies. In some examples, control module 22 can be integrated with the control system for the agricultural implement. In other examples, control module 22 can be separate from and in communication with the control system of the agricultural implement.

In examples where applicators 18 include nozzles, control module 22 can generate spray commands and provide the spray commands to the nozzles to cause the nozzles to emit liquid according to the desired application protocol. In some examples, control module 22 can provide the spray command to valve 26. Controller 22 activates valve 26 and sets the duty cycle at a desired level to provide the desired application rate. In some examples, control module 22 generates individual spray commands and provides an individual spray command to each applicator 18. The individual spray commands can be unique to each applicator 18 such that applicators 18 operate independently. In some examples, control module 22 provides individual spray commands to groups of applicators 18 such that each applicator 18 in the group of applicators 18 operates according to that spray command.

Bus 25 is a serial communication bus configured to facilitate communications within spray system 10. Bus 25 can be of any suitable type for facilitating communications within spray system 10, such as a controller area network (CAN) bus or a local interconnect network (LIN) bus, among other options.

Parameter sensor 28 can provide the parameter information to control module 22 via bus 25, and control module 22 can generate commands and control activation and operation of valve 26 based on the parameter information and the desired application rate. For example, control module 22 can provide spray commands to valve 26 to control the application rate by applicator 18.

The spray command can be based on any desired input parameter. For example, a prescription map, which provides the application protocol, for a field can be stored in memory 38 of control module 22, and control module 22 can generate the spray commands based on the prescription map. Control module 22 can be configured to generate the spray commands based on geo-positioning data. For example, system sensors 20 can include a geo-positioning receiver communicatively linked to control module 22. Control module 22 can thereby determine the relative location of applicators 18 in the field and generate commands based on the determined locations of applicators 18 and the prescription map. Control module 22 can be configured to generate commands based on location data from GPS (Global Positioning System), GNSS (Global Navigation Satellite System), GPS/RTK (GPS/Real Time Kinematic), or equivalent systems.

Control circuitry 36 is configured to implement functionality and/or process instructions and can include one or more processors configured to implement functionality and/or process instructions. For example, control circuitry 36 can be capable of processing instructions stored in memory 38. Examples of control circuitry 36 can include any one or more of a microprocessor, a controller, a digital signal processor (DSP), an application specific integrated circuit (ASIC), a field-programmable gate array (FPGA), or other equivalent discrete or integrated logic circuitry. In some examples, control circuitry 36 can include communications circuitry configured to facilitate wired or wireless communications. For example, the communications circuitry can facilitate radio frequency communications and/or can facilitate communications over a network, such as a local area network, wide area network, CAN bus, LIN bus, and/or the Internet.

Memory 38, in some examples, is described as computer-readable storage media. In some examples, a computer-readable storage medium can include a non-transitory medium. The term "non-transitory" can indicate that the storage medium is not embodied in a carrier wave or a propagated signal. In certain examples, a non-transitory storage medium can store data that can, over time, change (e.g., in random access memories (RAM) or cache). In some examples, memory 38 is a temporary memory, meaning that a primary purpose of memory 38 is not long-term storage. Memory 38, in some examples, is described as volatile memory, meaning that memory 38 does not maintain stored contents when power to spray system 10 is turned off. Examples of volatile memories can include RAM, dynamic random access memories (DRAM), static random access memories (SRAM), and other forms of volatile memories. In some examples, memory 38 is used to store program instructions for execution by control circuitry 36. For example, memory 38 can store instructions that, when executed by control circuitry 36, cause control module 22 to generate spray commands. Memory 38, in one example, is used by software or applications running on control circuitry 36 to temporarily store information during program execution.

Memory 38, in some examples, also includes one or more computer-readable storage media. Memory 38 can be configured to store larger amounts of information than volatile memory. Memory 38 can further be configured for long-term storage of information. In some examples, memory 38 includes non-volatile storage elements. For example, spray system 10 can include non-volatile storage elements such as flash memories or forms of electrically programmable memories (EPROM) or electrically erasable and programmable (EEPROM) memories. In some examples, memory 38 can be external and can be received in a memory card slot of spray system 10. For example, memory 38 can be an external hard drive, flash drive, memory card, secure digital (SD) card, micro SD card, or other such device.

User interface 24 can be any graphical and/or mechanical interface that enables user interaction with control module 22 and/or parameter sensor 28. For example, user interface 24 can implement a graphical user interface displayed at a display device of user interface 22 for presenting information to and/or receiving input from a user. User interface 24 can include graphical navigation and control elements, such as graphical buttons or other graphical control elements presented at the display device. User interface 24, in some examples, includes physical navigation and control elements, such as physically-actuated buttons or other physical navigation and control elements. In general, user interface 24 can include any input and/or output devices and control elements that can enable user interaction with control module 22. In some examples, user interface 24 can be integrated into a cab of an agricultural spraying implement.

As discussed above, spray system 10 is configured to apply liquids according to an application protocol. The application rate for a single applicator 18 can change throughout operation. The application rate is based on both the liquid flow rate and the speed of applicator 18 relative to the surface on which the liquid is being applied. In some examples, the relative ground speed of applicator 18 can be determined by control module 22 based on the location of applicator 18 on distribution line 16 and on the ground speed of spray system 10. For example, system sensors 20 can include ground speed sensors, such as speed sensors incorporating geo-positioning receivers. In one example, the ground speed sensors can be disposed at opposite ends of distribution lines 16. Control module 22 can determine the relative speed of its applicator 18 based on the location of its applicator 18 along distribution line 16 and the ground speed at each end of distribution line 16. It is understood, however, that system sensors 20 can include any type of sensor suitable for generating the ground speed data. It is understood that the relative ground speed of applicator 18 can be determined according to any suitable technique.

During operation, control module 22 generates spray commands and transmits the spray commands to applicator 18. In some examples, control module 22 generates individual spray commands and transmits the individual spray commands to individual applicators 18. The spray commands cause the applicators 18 to emit liquid sprays according to a desired application rate. For example, control module 22 can generate the spray commands based on a prescription map for the field that spray system 10 is traversing. The prescription map can be stored in memory 38.

In examples where valve 26 is actively controlled, control module 22 activates valve 26 to begin spraying. Valve 26 pulses between the open state and the closed state according to an initial duty cycle to control the flow rate downstream through valve 26 and out of applicator 18.

Pressure sensor 34 senses the fluid pressure within applicator 18 and generates pressure data regarding that fluid pressure. Parameter sensor 28 can determine the pressure level based on the generated pressure data. Flow meter 32 senses the fluid flow through applicator 18 and generates flow data regarding that fluid flow. Parameter sensor 28 can determine the flow rate based on the generated flow data.

Applicators 18 are controlled based on the pressure information and/or flow information received from parameter sensor 28. The duty cycle of valve 26 is controlled based on the parameter information to ensure that applicator 18 emits liquid according to the desired application rate.

For example, control module 22 can determine the ground speed of spray system 10 based on data generated by system sensors 20. The application rate for any given applicator 18 can be determined based on the relative ground speed of that applicator 18 and the flow rate through that applicator 18. Control module 22 adjusts the duty-cycle percentage of valve 26 based on one or both of the sensed flow rate and liquid pressure. For example, valve 26 can initially reciprocate at a 50-percent duty cycle, such that valve 26 is in the open state for half of each cycle and in the closed state for half of each cycle. If the flow rate is below the desired flow rate, control module 22 can increase the duty-cycle percentage, thereby increasing the portion of each cycle that valve 26 is in the open state and increasing the flow relative to the 50-percent duty cycle. If the flow rate is above the desired flow rate, control module 22 can decrease the duty-cycle percentage, thereby decreasing the portion of each cycle that valve 26 is in the open state and decreasing the flow relative to the 50-percent duty cycle. The data generated by parameter sensor 28 is utilized by control module 22 to adjust the duty cycle of valve 26 to ensure that the liquid is sprayed according to the desired application rate.

The data generated by parameter sensor 28 can further be utilized to determine a status of applicator 18. In some examples, parameter sensor 28 is configured to generate an applicator status based on the parameter information. Applicator 18 emits the liquid through an application point that can wear or become partially or fully clogged during operation, such as a spray orifice or other such opening. When applicator 18 is operating normally, the flow rate and pressure level sensed by parameter sensor 28 fall within an expected operating rage. The parameter information generated by parameter sensor 28 can be compared to the expected range and/or to thresholds to determine the status of applicator 18. The actual flow rate and/or pressure fall outside of the expected ranges or exceed or fall below thresholds can indicate that applicator 18 is operating abnormally. Parameter sensor 28 can generate an abnormal status alert based on parameter sensor 28 determining that applicator 18 is operating abnormally. Parameter sensor 28 can, in some examples, provide that alert to the user via user interface 24. In some examples, parameter sensor 28 can provide the parameter information to control module 22 and control module 22 can determine the applicator status based on the parameter information.

For example, the flow data generated by parameter sensor 28 can indicate that the flow falls below the expected range or lower threshold. Such a reading can indicate that the applicator opening is partially or fully clogged. If the flow is higher than the expected range or upper threshold, such a reading can indicate that the application point is worn and emitting more liquid than expected. The flow data and/or pressure data can be compared to the expected values and/or thresholds to determine if the flow rate and/or pressure fall outside of an operable range. Parameter sensor 28 and/or control module 22 can generate an abnormal status alert based on the discrepancy and provide that alert to the user, such as via user interface 24. The abnormal status alert allows the user to address abnormal applicators 18 as the abnormality arises. This prevents over- and/or under-application from occurring due to the abnormal operating conditions. As such, parameter sensor 28 provides a real-time monitoring system for spray system 10.

Control module 22 can receive data from parameter sensor 28 and communicate that information to the user via user interface 24. As discussed above, control module 22 can generate a notification regarding the applicator status and provide that notification to the user. In some examples, control module 22 can provide both normal applicator status notifications to the user, indicating which applicators 18 are operating normally, and abnormal applicator status notifications to the user, indicating applicators 18 that are operating abnormally. In some examples, control module 22 can provide the sensed flow rate and/or pressure to the user. The user can control operation of spray system 10 based on that information. The data generated by parameter sensor 28 can be also stored in memory 38 for later use. For example, the data can provide the user information regarding the application rates that were actually applied during the spray operation. This information allows the user to know the actual application rate that the liquid was applied in the field, allowing the user to better plan future applications. The user can take actions and plan future applications based on the tracked data.

Spray system 10 provides significant advantages. Integrating parameter sensor 28 into applicator 18 provides applicator-level sensing of the parameters of the liquid flowing through applicator 18. Parameter sensors 28 thereby provide individual feedback regarding the operation of each applicator 18. Parameter sensor 28 can determine the flow rate and pressure at each applicator 18. Knowing the actual flow rate and pressure at each applicator 18 allows the user to address any faults that may occur in real time, preventing both under-application and over-application, which avoids material waste and ensures proper operation of spray system 10. In addition, applicators 18 can be discretely controlled to provide different application rates at different applicators 18. Control module 22 can generate spray commands for the individual applicator 18 based on the parameters sensed for that individual applicator 18. The duty cycle of valve 26 can be controlled to provide the desired application rate. Parameter sensor 28 also provides applicator-level data tracking within spray system 10. The data generated can be stored for later analysis and use, providing more accurate data to users and enabling more efficient spray operations and planning.

Figure 2A:
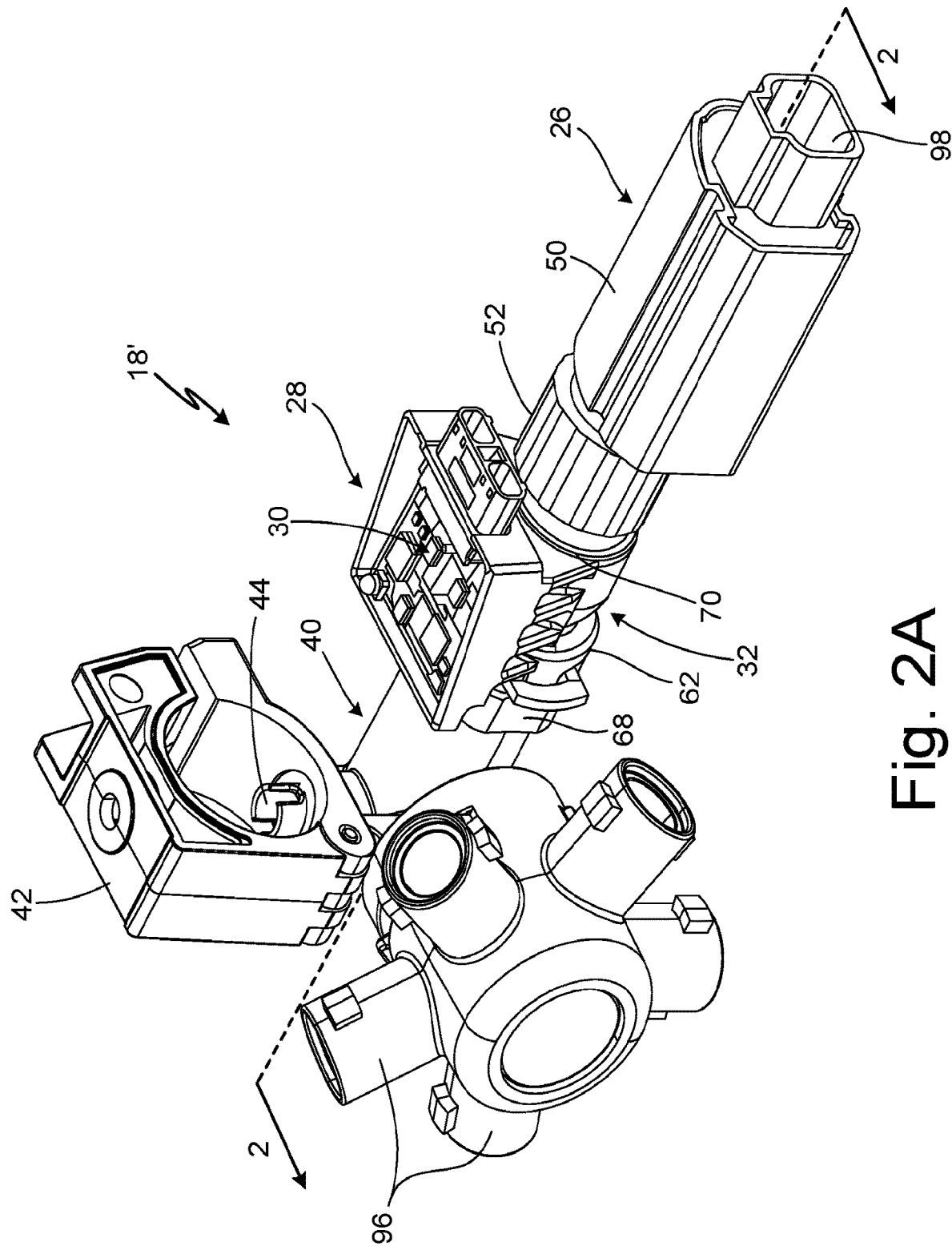
FIG. 2A is an isometric view of a spray applicator including a valve.
Figure 2B:
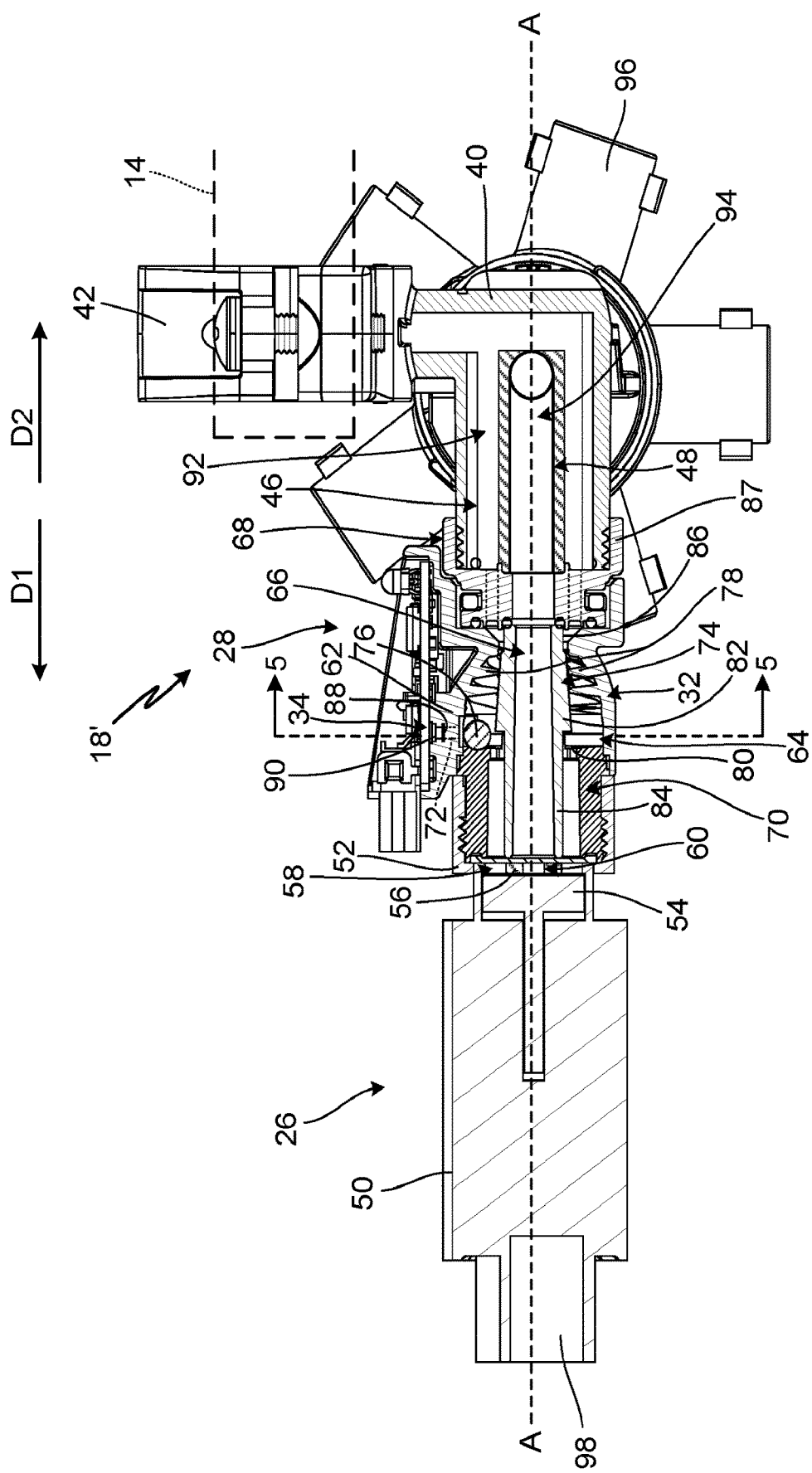
FIG. 2B is a cross-sectional view of the spray applicator shown in FIG. 2A taken along line 2-2 in FIG. 2A.

FIG. 2A is an isometric view of applicator 18'. FIG. 2B is a cross-sectional view taken along line 2-2 in FIG. 2A. FIGS. 2A and 2B will be discussed together. Applicator 18' includes valve 26, parameter sensor 28, body 40, clamp 42, inlet port 44 (FIG. 2A), first flowpath 46 (FIG. 2B), and second flowpath 48 (FIG. 2B). Valve 26 includes valve body 50, connector 52, valve member 54 (FIG. 2B), seat 56 (FIG. 2B), valve inlet 58 (FIG. 2B), valve outlet 60 (FIG. 2B), and port 98. Parameter sensor 28 includes sensor circuitry 30 (FIG. 2A), flow meter 32, pressure sensor 34, housing 62, first sensor pathway 64 (FIG. 2B), and second sensor pathway 66 (FIG. 2B). Housing 62 includes first end 68, second end 70, and pressure port 72 (FIG. 2B). Flow meter 32 includes central member 74 (FIG. 2B), ball 76 (FIG. 2B), splines 78 (FIG. 2B), and base 80 (FIG. 2B). Central member 74 includes member body 82 (FIG. 2B), inlet end 84 (FIG. 2B), and outlet end 86 (FIG. 2B). Pressure sensor 34 includes diaphragm 88 (FIG. 2B) and sensor component 90. Body 40 includes inlet path 92 (FIG. 2B), outlet path 94 (FIG. 2B), and turrets 96. A portion of boom 14 is shown in FIG. 2B.

Applicator 18' is substantially similar to applicator 18 (FIG. 1). Applicator 18' is configured to mount to boom 14 to receive liquid from boom 14. In the example shown, applicator 18' is a nozzle configured to generate a liquid spray for application on a target surface. In some examples, applicator 18' is operatively connected to a controller. The controller can be substantially similar to control module 22 (FIG. 1) and can be operated in accordance with techniques described herein. The controller can be located remote from applicator 18' and communicatively coupled to applicator 18'. It is understood that the controller can be configured in any manner suitable for performing the functionalities discussed herein. The controller can, among other functionalities, control operation of valve 26, receive parameter data from parameter sensor 28, determine the flow rate and pressure level of the liquid flowing through valve 26, determine an actual application rate for applicator 18', and control operation of applicator 18' to a desired application rate. It is understood, however, that in some examples applicator 18' does not include a valve or other device for controlling flow through applicator 18'. In such an example, the liquid flows through applicator 18' and is emitted.

Clamp 42 is attached to body 40. Clamp 42 mounts to boom 14 and secures applicator 18' to boom 14. It is understood, however, that applicator 18' can be mounted to boom 14 in any desired manner. Inlet port 44 projects through clamp 42 and is configured to extend into boom 14 through a mounting opening in boom 14. Inlet port 44 fluidly connects the flow paths through applicator 18' with the flow path in boom 14. First flowpath 46 extends from inlet port 44 to valve 26. In the example shown, first flowpath 46 extends through body 40, parameter sensor 28, and valve 26. Second flowpath 48 extends from valve 26 to the spray outlet of applicator 18'. In the example shown, second flowpath 48 extends through valve 26, parameter sensor 28, and body 40. The liquid flows in opposite axial directions D1 and D2 through first flowpath 46 and second flowpath 48, respectively. Second flowpath 48 is surrounded by first flowpath 46, thereby providing a compact arrangement of applicator 18'.

Inlet path 92 forms a portion of first flowpath 46. Inlet path 92 extends through body 40 and is in fluid communication with boom 14 via inlet port 44. Outlet path 94 forms a portion of second flowpath 48. Outlet path 94 extends through body 40 and provides fluid to the spray orifice of applicator 18' via turrets 96. A portion of outlet path 94 is coaxial with a portion of inlet path 92. Inlet path 92 can have an annular cross-section and outlet path 94 can have a circular cross-section, but it is understood that other cross-sectional configurations can be utilized. In the example shown, outlet path 94 has a smaller diameter than either the inner or outer diameters of inlet path 92 and is disposed concentric with inlet path 92. Inlet path 92 and outlet path 94 being concentric facilitates a compact applicator 18'.

Turrets 96 are fluidly connected to outlet path 94 and provide pathways for the liquid to exit applicator 18'. During operation, only one of turrets 96 is fluidly connected to outlet path 94 at any given time. As such, only one of turrets 96 emits liquid spray at any time. Each turret 96 can include a spray tip attached to the distal end of the turret 96. The spray tip includes an orifice that are configured to atomize the liquid to generate the liquid spray. The multiple spray tips can include orifices of different configurations, such as different sizes and/or shapes, to generate different spray patterns. In some examples, the portion of body 40 from which turrets 96 extend is rotatable. For example, that portion of body 40 can rotate about an axis transverse to, and in some examples perpendicular to, axis A-A. As such, body 40 can be rotated to position the turret 96 having the desired orifice configuration to receive fluid from outlet path 94. As such, the user can rotate between turrets 96 to select the appropriate spray orifice for generating a spray having the desired spray qualities. While applicator 18' is described as including multiple turrets 96, it is understood that applicator 18' can, in some examples, include a single turret 96 for generating the liquid spray.

Parameter sensor 28 is mounted to body 40 and supported by body 40. First end 68 of sensor housing 62 to connected to body 40. Connector 87 is attached to sensor housing 62 and body 40 and supports parameter sensor 28 on body 40. Connector 87 can be connected to body 40 by interfaced threading, though other connection types are possible. Connector 87 can be connected to sensor housing 62 in any desired manner, such as a bayonet type connection, as discussed in more detail with regard to FIGS. 3A and 3B. In some examples, sensor housing 62 can be directly connected to body 40. For example, first end 68 and body 40 include interfacing threading to secure parameter sensor 28 to body 40. It is understood, however, that parameter sensor 28 and body 40 can be configured to connect in any desired manner, including a press-fit interface, snaps, bands, or a bayonet interface, among other options. In some examples, parameter sensor 28 is formed from different components and assembled together. In some examples sensor housing 62 is formed from different components assembled together, such as by first end 68 being formed on a first component and second end 70 being formed on a second component connected to the first component. The portions of sensor housing 62 can be permanently (e.g., by adhesive, press-fitting, etc.) or removably (e.g., by threading, bayonet type, etc.) connected. In other examples, parameter sensor 28 is formed as a single component. In some examples, parameter sensor 28 and applicator 18' can be formed as a single part. It is understood that parameter sensor 28 and applicator 18' can be connected in any desired manner. Parameter sensor 28 includes sensor circuitry configured to determine the flow rate and pressure level of the liquid based on the data generated by flow meter 32 and pressure sensor 34.

Sensor circuitry 30 is operatively connected to flow meter 32 and pressure sensor 34. Sensor circuitry 30 can be of any suitable configuration for controlling operation of parameter sensor 28', gathering data, processing data, etc. Sensor circuitry 30 can be configured to determine the pressure level and/or flow rate based on data received from flow meter 32 and pressure sensor 34. Software can be stored in a memory of sensor circuitry 30 that, when executed by processing circuitry of sensor circuitry 30, causes parameter sensor 28 to convert the pressure data to a pressure information, such as the fluid pressure, and convert the flow data to flow information, such as a flow rate.

First sensor pathway 64 extends through parameter sensor 28 from first end 68 to second end 70. First sensor pathway 64 forms a portion of first flowpath 46. Second sensor pathway extends through parameter sensor 28 from second end 70 to first end 68. Second sensor pathway 64 forms a portion of second flowpath 48. First sensor pathway 64 and second sensor pathway 66 are coaxially disposed. First sensor pathway 64 and second sensor pathway 66 being coaxial facilitates a compact configuration of parameter sensor 28. First sensor pathway 64 is fluidly isolated from second sensor pathway 66 such that fluid cannot flow from first sensor pathway 64 to second sensor pathway 66 without first flowing through valve 26.

Flow meter 32 is configured to generate flow data regarding the flow of liquid through applicator 18'. Splines 78 extend substantially radially inward from sensor housing 62 towards central member 74. While splines 78 are shown as extending from sensor housing 62, it is understood that a separate component, such as meter body 102 (FIG. 3B), can be disposed in sensor housing 62 with splines 78 extending from that other component. Central member 74 extends through sensor housing 62 and is fluidly connected to each of valve outlet 60 and outlet path 94. Central member 74 is hollow and includes a bore extending through member body 82 that defines second sensor pathway 66. Inlet end 84 of central member 74 interfaces with valve 26 to receive fluid from valve 26. Outlet end 86 of central member 74 interfaces with connector 87 to provide fluid to outlet path 94. In some examples, outlet end 86 can interface directly with body 40 to provide fluid to outlet path 94. Central member 74 can be formed in any desired manner, such as by molding. Central member 74 fluidly separates first sensor pathway 64 and second sensor pathway 66.

Ball 76 is disposed between sensor housing 62 and central member 74. Ball 76 is constrained from substantial axial movement by splines 78 and base 80. In the example shown, base 80 is formed by a shoulder of sensor housing 62. It is understood, however, that base 80 can be formed in any desired manner suitable for limiting axial movement of ball 76. For example, base 80 can be formed as a shoulder projecting from central member 74 or can be formed from a separate component disposed within sensor housing 62, among other options.

Flow meter 32 is configured to generate flow data based on rotation of ball 76 about axis A-A. As discussed in more detail below with regard to FIGS. 5A-5B, flow meter 32 includes a rotational sensor 116 (FIGS. 5-6B) configured to sense rotation of ball 76. For example, flow meter 32 can include an emitter, such as a light emitting diode (LED), and a receiver, such as a photodiode. The emitter emits light into the rotational path of ball 76 and the receiver senses reflection of the light. As ball 76 passes emitter the light is reflected by ball 76 and such reflection is sensed by the receiver. The receiver can generate an output signal to sensor circuitry 30 (FIGS. 2A and 3A-3B) indicating passes of ball 76. For example, passes of ball 76 can be seen as spikes in the output signal. The flow data, such as a pass count of ball 76, is generated over time and the flow rate can be determined based on that flow data. In some examples, the rotational sensor 116 can be a proximity sensor. In some examples, flow meter 32 can be configured to electromagnetically generate data regarding the flow. In some examples, flow meter 32 can include a magnetic ball 76 and a proximity sensor, such as a Hall-effect sensor, to sense passes of the ball. In the example shown, the sensing components of flow meter 32 are disposed upstream of valve 26.

In examples where applicator 18' includes a PWM valve 26, valve 26 generates turbulence in the liquid flow as valve 26 pulses between the open state and the closed state. Splines 78 and central member 74 form helical flowpaths that form first sensor pathway 64 through flow meter 32. The helical flowpaths create a cyclonic flow effect that induces rotation of ball 76 about axis A-A. The cyclonic flow meter 32 smooths the flow through flow meter 32, thereby counteracting the turbulence generated by valve 26. In some examples, the flow cyclonic flow effect can create a laminar flow through flow meter 32. Flow meter 32 can thereby provide accurate flow data even when disposed in close proximity to an actively controlled valve 26.

Pressure port 72 extends through sensor housing 62 and is fluidly connected to first sensor pathway 64. Pressure sensor 34 is disposed at pressure port 72. Diaphragm 88 is disposed at pressure port 72 such that the fluid pressure flowing through first sensor pathway 64 acts on and is experienced by diaphragm 88. Diaphragm 88 can be of any configuration suitable for flexing in response to the liquid pressure. For example, diaphragm 88 can be metallic, rubber, or thermoplastic, among other options. In one example, diaphragm 88 is formed from stainless steel. Pressure port 72 extends from and is fluidly connected to first sensor pathway 64. In the example shown, pressure port 72 extends from the chamber 79 (FIG. 5) that ball 76 is disposed within. Pressure port 72 can be circumferentially aligned with rotational sensor 116. Pressure sensor 34 can thereby receive pressure data from the same chamber 79 that the ball 76 races within.

Pressure sensor 34 is configured to generate pressure data based on the flexing of diaphragm 88. For example, sensor component 90 can include a piezo-resistive or piezoelectric component. Flexing of the diaphragm 88 exerts a force on the component to exhibit a response proportional to the force exerted. A signal, either analog or digital, is generated and the sensor circuitry can determine the sensed liquid pressure based on the flow data generated, such as based on a voltage emitted by the component or a change in resistance of the component. In some examples, pressure sensor 34 can include an internal charge amplifier configured to provide the voltage output. In the example shown, the sensing components of pressure sensor 34 are disposed upstream of valve 26.

Valve 26 is attached to second end 70 of sensor housing 62. As such, valve 26 is connected to applicator 18' via parameter sensor 28. In the example shown, valve 26 is an actively controlled valve. For example, valve 26 can be a PWM valve. It is understood, however, that applicator 18' does not include valve 26 in all examples. Valve 26 can be omitted such that the liquid flows through applicator 18' when boom 14 is pressurized. In other examples, valve 26 can be a passive pressure-activated check valve. The passive valve is configured to open when the boom pressure 14 reaches a sufficient level. The passive valve closes when the pressure falls below the level to prevent leakage through applicator 18'.

In examples where valve 26 is actively controlled, parameter sensor 28 and valve 26 form a sensing and control assembly that is cantilevered from body 40. Connector 52 interfaces with second end 70 of sensor housing 62 to secure valve 26 to parameter sensor 28. In some examples, connector 52 includes threading configured to interface with threading on second end 70. It is understood, however, that valve 26 can be mounted to parameter sensor 28 in any suitable manner. For example, valve 26 can be mounted to parameter sensor 28 by a press-fit interface, snaps, bands, or a bayonet interface, among other options.

Valve inlet 58 extends from first sensor pathway 64 to valve member 54. Valve inlet 58 provides a flowpath for liquid to enter valve 26. Valve inlet 58 forms a portion of first flowpath 46. In some examples, valve inlet 58 is an annular flowpath extending around valve outlet 60. Valve outlet 60 extends from valve member 54 to central member 74. Valve outlet 60 provides a flowpath for liquid to exit valve 26. Valve outlet 60 forms a portion of second flowpath 48.

Valve body 50 supports various other components of valve 26. Port 98 extends into an end of valve body 50 opposite parameter sensor 28. Port 98 is configured to receive a connector to provide power and/or communications to valve 26. An actuator is disposed in valve body 50. The actuator is operatively associated with valve member 54 and is configured to drive reciprocation of valve member 54. For example, the actuator can include a solenoid for driving valve member 54. The solenoid can be double acting, such that valve member 54 is electrically driven in both directions on axis A-A, or single acting, such that valve member 54 is electrically driven in one direction on axis A-A and mechanically driven in the other direction on axis A-A, such as by a spring.

Seat 56 is formed on an inner wall portion of valve body 50. Similar to body 40, valve body 50 includes concentric flowpaths that are separated by a portion of valve body 50. The concentric flowpaths form valve inlet 58 and valve outlet 60. Valve member 54 engages seat 56 to close the flowpath between valve inlet 58 and valve outlet 60 and disengages from seat 56 to open the flowpath between valve inlet 58 and valve outlet 60. Valve member 54 is configured to reciprocate along axis A-A between the open state and the closed state. Valve 26 is controllable to vary the duty cycle and/or frequency of reciprocation of valve member 54.

Parameter sensor 28 can be retrofit onto existing applicators 18' to provide parameter sensing to applicators 18'. First end 68 of parameter sensor 28 is configured to mount to body 40 by interfacing between first features on first end 68 and second features on body 40. In the example shown, first end 68 includes connector 87 that interfaces with body 40. The housing 62 interfaces with connector by a bayonet style connection and connector 87 interfaces with body 40 by threaded couplings. Second end 70 includes the second features to facilitate placement of parameter sensor 28 in the existing applicator 18'. A component that previously mounted to second features on body 40 can thus be mounted to parameter sensor 28. In the example shown, valve 26 is configured to connect to second features on second end 70. The connecting features also facilitate mounting of parameter sensor 28 at multiple locations on body 40. For example, parameter sensor 28 can be directly mounted to a turret 96 by a bayonet connection. Connector 87 can be removed from parameter sensor 28 to facilitate mounting parameter sensor 28 directly to turret 96.

Retrofitting parameter sensor 28 onto applicator 18' provides parameter sensing capabilities to applicators 18' that previously lacked such capabilities. Parameter sensor 28 can determine the flow rate and pressure through applicator 18'. That information can be communicated to user, such as by sensor circuitry 30 and/or via the controller, thereby providing real-time information regarding the operation of applicator 18'.

During operation, pressurized fluid is provided to boom 14. The pressurized fluid flows downstream through boom 14 to applicator 18'. The controller generates a spray command and provides the spray command to valve 26 to initiate flow through applicator 18' and commence spraying. The spray command causes valve 26 to cycle at a desired duty cycle to provide a desired flow rate at the spray orifice. When valve member 54 is in the open state, the fluid flows through body 40, through flow meter 32, through valve 26, through central member 74, and through body 40 to turrets 96. When valve member 54 is in the closed state, the fluid flowpath through valve 26 is closed, such that the fluid is prevented from flowing to valve outlet 60, through central member 74, and through outlet path 94 to turrets 96.

The pressurized fluid enters body 40 via inlet port 44. The liquid flows through inlet path 92 to parameter sensor 28. More specifically, the liquid flows in direction D1 through inlet path 92 and into first sensor pathway 64 of flow meter 32. Splines 78 induce a cyclonic flow through first sensor pathway 64. The cyclonic flow drives ball 76 about axis A-A such that ball 76 rotates about axis A-A. Rotation of ball 76 is sensed by the rotational sensor of flow meter 32 and that rotational information can be provided to the controller to determine the flow rate of the liquid. The liquid exits flow meter 32 between base 80 and central member 74 and flows to valve member 54 through valve inlet 58. In the example shown, pressure port 72 is fluidly connected to a portion of first sensor pathway 64 between flow meter 32 and valve member 54. Pressure sensor 34 senses the fluid pressure at pressure port 72 and generates pressure data that can be provided to the controller. Sensor circuitry 30 receives the flow data and pressure data and determines the flow rate and liquid pressure in applicator 18'.

When spraying is initiated, the actuator of valve 26 is powered and drives reciprocation of valve member 54. Valve member 54 shifts to the open state and the boom pressure drives the fluid in body 40 past valve member 54 and into valve outlet 60. The fluid flows in direction D2 through valve outlet 60, second sensor pathway 66, and outlet path 94. Outlet path 94 includes a turn at the distal end of outlet path 94, which can be, in some examples, about a 94-degree turn. Outlet path 94 continues from the turn and extends to turrets 96 to provide the fluid to turrets 96 for spraying.

Parameter sensor 28 determines the flow rate and liquid pressure in applicator 18'. In some examples, parameter sensor 28 can provide that information to a controller and the controller can determine the application rate through applicator 18' based on the parameter data from parameter sensor 28 and the ground speed data received from system sensors 20 (FIG. 1). The controller can adjust the duty cycle of valve 26 to alter the fluid flow rate through applicator 18'. As such, the controller can adjust the duty cycle to control the application rate of applicator 18'. In some examples, the controller can provide the pressure information and the flow information to the user. The user can control individual applicators 18' based on the pressure and flow information provided by parameter sensor 28. The applicator status can also be determined based on the pressure and flow information generated by parameter sensor 28.

Parameter sensor 28 provides significant advantages. Parameter sensor 28 can be retrofit onto applicator 18' to provide accurate pressure and flow information regarding the liquid flow through applicator 18'. Parameter sensor 28 can be mounted at various locations on body 40 according to the particular needs of a project or system. Parameter sensor 28 provides a compact module that facilitates flow rate and pressure sensing where such capabilities did not previously exist. As such, a user can install parameter sensor 28 on existing applicators 18' to provide a low-cost easily integrated module that provides real-time feedback of the actual flow rate and pressure at applicator 18'. The user can take actions based on the information generated by parameter sensor 28, such as by replacing worn applicators 18' or unclogging applicators 18'. Moreover, the information generated by parameter sensor 28 allows for more precise control over applicator 18' to ensure that the liquid is applied in a desired manner. The applicator-level sensing facilitates individual control of all applicators 18' within a spray system, such as spray system 10 (FIG. 1). Individually controlling each applicator 18' increases the efficiency of the spray operation, prevents material waste, and increases field production due to the more precise and accurate spray application.

The cyclonic flow meter 32 counteracts the turbulence generated by valve 26 and smooths the flow through flow meter 32. The smooth flow allows flow meter 32 to accurately generate flow data. Valve 26 can be a PWM valve, which provides additional functionality and control to applicator 18'. Valve 26 can be pulsed according to a desired duty cycle to control the flow rate of the liquid. Applicator 18' can thus be controlled such that applicator 18' can emit flows across a variety of flow rates, thereby allowing applicator 18' to provide a variety of application rates. Pulsing valve 26 between the open and closed states maintains the integrity and quality of the spray pattern generated by applicator 18' across a range of flow rates. In some examples, applicator 18' can operate at flow rates between about 0.1-2.7 gallons per minute (GPM). In some examples, applicator 18' can operate at flow rates up to about 5 GPM.

Figure 3A:
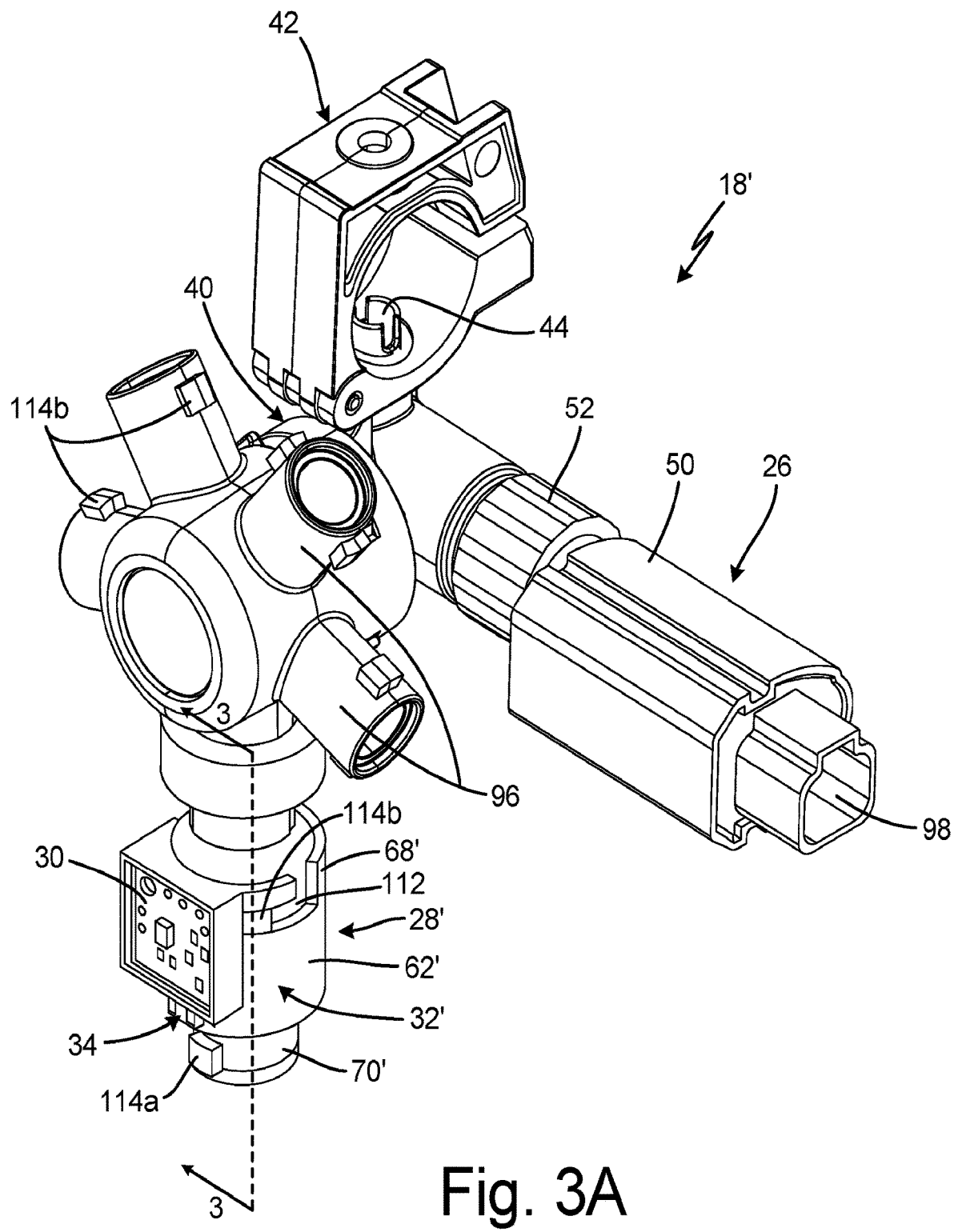
FIG. 3A is an isometric view of another spray applicator including a valve.
Figure 3B:
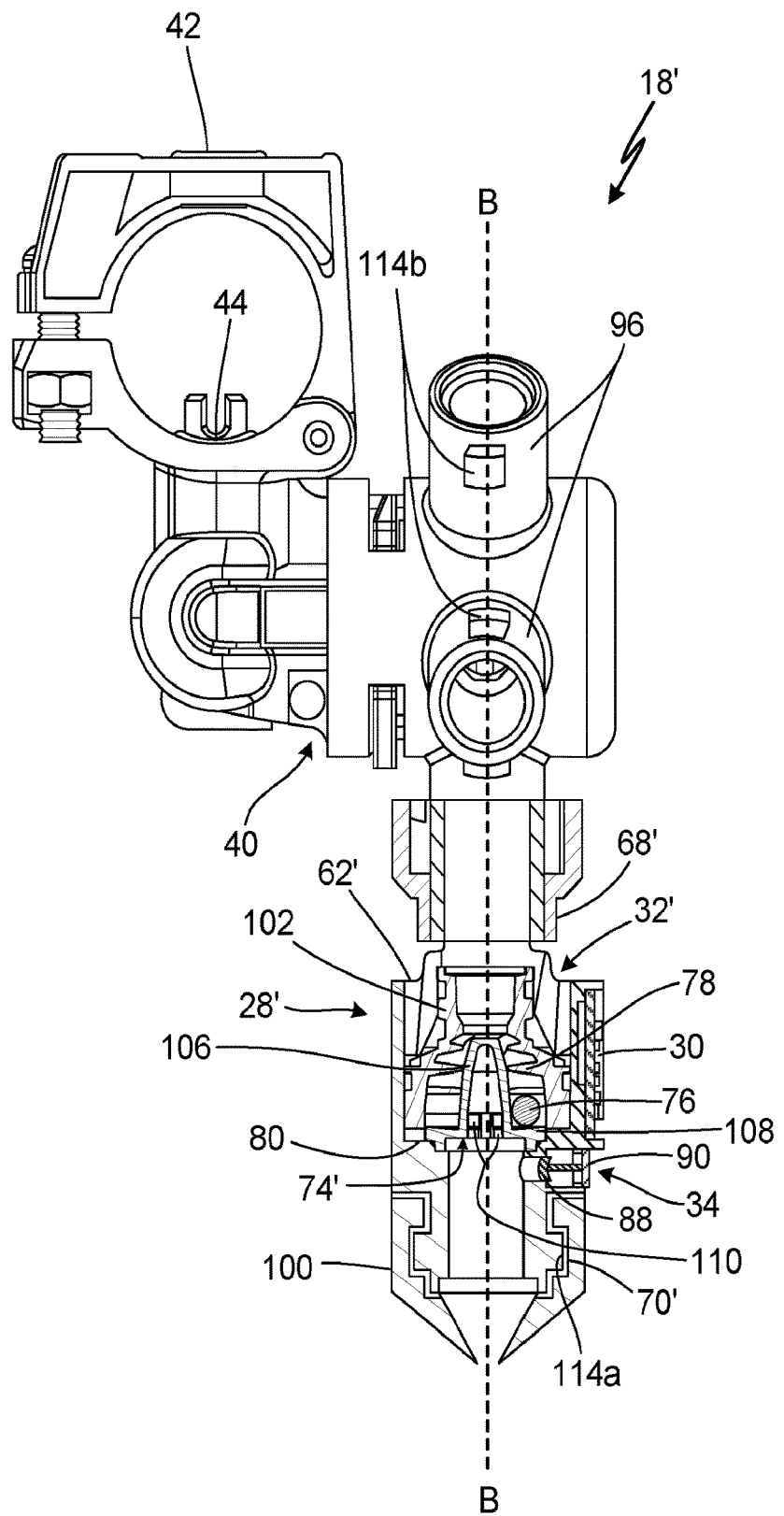
FIG. 3B is a partial cross-sectional view of the spray applicator shown in FIG. 3A taken along line 3-3 in FIG. 3A.

FIG. 3A is an isometric view of applicator 18'. FIG. 3B is a partial cross-sectional view of applicator 18'. FIGS. 3A and 3B will be discussed together. Applicator 18' includes valve 26 (FIG. 3A), parameter sensor 28', body 40, clamp 42, inlet port 44, and spray tip 100 (FIG. 3B). Valve body 50 (FIG. 3A), connector 52 (FIG. 3A), and port 98 (FIG. 3A) of valve 26 are shown. Parameter sensor 28' includes flow meter 32', pressure sensor 34, housing 62', and sensor circuitry 30. Housing 62' includes first end 68' and second end 70'. First end 68' includes slots 112 (FIG. 3A) and second end 70' includes projections 114a. Flow meter 32' includes central member 74' (FIG. 3B), ball 76 (FIG. 3B), base 80 (FIG. 3B), and meter body 102 (FIG. 3B). Meter body 102 includes splines 78 (FIG. 3B). Central member 74' includes cone 106 (FIG. 3B), flange 108 (FIG. 3B), and ports 110 (FIG. 3B). Pressure sensor 34' includes diaphragm 88 and sensor component 90. Turrets 96 of body 40 are shown. Each turret 96 includes projections 114b.

Applicator 18' is substantially similar to applicator 18 (FIG. 1). As shown, parameter sensor 28' is located downstream of turrets 96 instead of upstream of turrets 96 and the liquid flows in a single direction through parameter sensor 28', whereas liquid flows in two opposing directions through parameter sensor 28 (FIG. 2B). Parameter sensor 28' is disposed in the second flowpath 48 (FIG. 2B) out of applicator 18'.

Applicator 18' is configured to mount to a boom, such as boom 14 (FIGS. 1 and 2B), and/or to a distribution line, such as distribution lines 16, to receive liquid from the boom. In the example shown, applicator 18' is a nozzle. Applicator 18' generates a liquid spray and ejects the liquid spray for application on a target surface. Clamp 42 is attached to body 40. Clamp 42 is configured to mount to boom 14 and secure applicator 18' to boom 14. Inlet port 44 projects through clamp 42 and is configured to mate with the boom to receive liquid from the boom.

Valve 26 is attached to body 40 such that valve 26 is supported by body 40. Valve 26 can be an actively controlled valve, such as a PWM valve that pulses between open and closed states during operation. In other examples, applicator 18' includes a passive check valve. In yet other examples, applicator 18' does not include a valve. Connector 52 attaches to body 40 and secures valve 26 to body 40. In the example shown, connector 52 is a rotatable threaded coupling configured to mate with threading on body 40. It is understood, however, that connector 52 can be of any desired configuration for securing valve 26 to body 40. Port 98 is disposed at an end of valve 26 opposite connector 52. Port 98 is configured to receive a plug to provide power and/or communications to valve 26. As discussed above, valve 26 can be actively controlled during operation to vary the duty cycle of valve 26 and thereby control the flow rate through applicator 18' and thus control the application rate in the field.

Turrets 96 are fluidly connected to body 40 to receive liquid from body 40. During operation, only one of the turrets 96 shown is fluidly connected to outlet path 94 (FIG. 2B) to receive spray fluid at a given time. Each turret 96 is configured to receive spray tip 100 (only one shown) attached to the distal end of the turret 96. Projections 114*b* extend from each turret 96. Projections 114*b* are configured to mate with slots spray tip 100 to connect spray tip 100 to turret 96. As such, turret 96 and spray tip 100 can be connected via a bayonet connection. It is understood, however, that turret 96 and spray tip 100 can be connected in any suitable manner, such as by a threaded connection, a press-fit connection, or a snap connection, among other options. The multiple spray orifices can be of different configurations, such as different shapes and/or sizes, to generate different spray patterns. The user can alter the spray pattern by positioning the turret 96 having the spray tip 100 with the desired orifice configuration to receive the liquid from outlet path 94. While applicator 18' is described as including multiple turrets 96, it is understood that applicator 18' can include a single turret 96.

Parameter sensor 28' is mounted to turret 96. Parameter sensor 28' is disposed between turret 96 and spray tip 100. Parameter sensor 28' is supported by turret 96 and supports spray tip 100. In some examples, each turret 96 can include a parameter sensor 28'. As such, applicator 18' can include a plurality of parameter sensors 28'. Slots 112 are formed in first end 68' of parameter sensor 28'. The slots 112 are configured to receive projections 114*b* extending from turret 96 to secure parameter sensor 28' to turret 96. As such, parameter sensor 28' can connect to turret 96 via a bayonet connection. It is understood, however, that parameter sensor 28' and turret 96 can be connected in any desired manner, such as interfaced threading, press-fitting, snaps, levers, or bands, among other options. Projections 114*a* are formed on second end 70' of parameter sensor 28'. Projections 114*a* are configured to be received by slots, similar to slots 112, formed on spray tip 100. Projections 114*a* facilitate mounting of spray tip 100 on parameter sensor 28'. In some examples, projections 114*a* are of the same configuration as projections 114*b*.

Flow meter 32' is configured to generate flow data regarding the liquid flow through parameter sensor 28'. Meter body 102 is disposed within sensor housing 62. Meter body 102 receives fluid flow entering first end 68' of parameter sensor 28'. Splines 78 project substantially radially inward from meter body 102 towards axis B-B. Splines 78 and central member 74' define cyclonic flow paths through flow meter 32 that impart a rotational flow component on the liquid flowing through flow meter 32. The rotational flow component causes the liquid to swirl about axis B-B as the liquid flows through flow meter 32, thereby creating a cyclonic flow. The rotating flow drives rotation of ball 76 about axis B-B, which rotation is detected and utilized to compute the flow rate through flow meter 32. Sensor circuitry 30 can determine the flow rate based on the rotation count of ball 76.

Central member 74' is disposed within sensor housing 62'. Flange 108 projects radially from cone 106 and is supported by base 80 formed by sensor housing 62'. In some examples, flange 108 extends annularly about axis B-B. Cone 106 extends from flange 108 towards first end 68'. Cone 106 is positioned relative splines 78 to define the cyclonic flow paths through flow meter 32. Ball 76 can be supported by flange 108 and can rotate on flange 108 about cone 106. Ports 110 extend through central member 74' proximate the interface between flange 108 and cone 106. It is understood that ports 110 can be formed at any suitable location on central member 74' for providing flow paths for fluid to exit flow meter 32. In one example, ports 110 are formed on cone 106. In another example, ports 110 are formed through flange 108. In yet another example, ports 110 are formed through both cone 106 and flange 108 and can extend through the interface between cone 106 and flange 108. In some examples, central member 74' includes subsections of ports 110 through cone 106, flange 108, and/or the interface between cone 106 and flange 108. In some examples, ports 110 direct the liquid flow radially inward towards axis B-B. In some examples, ports 110 can impart both axial and radial components on the flow or can direct the flow axially along axis B-B. It is understood, however, that ports 110 can be of any desired configuration.

Pressure port 72 extends through sensor housing 62' at a location downstream of meter body 102. Pressure sensor 34 is mounted to pressure port 72. Diaphragm 88 is disposed at pressure port 72 and exposed to the fluid flowing through parameter sensor 28'. Sensor component 90 is disposed at pressure port 72 and includes and/or houses various components configured to generate pressure data based on the flexing of diaphragm 88. For example, sensor component 90 can include a piezo-resistive component, a piezoelectric component, or any other component suitable for generating flow data regarding the applicator pressure. Diaphragm 88 flexes and exerts a force on the component. The force causes a reaction in the component, such as causing the component to emit a voltage or exhibit a change in resistance, which reaction can be analyzed to determine the liquid pressure. It is understood, however, that pressure sensor 34 can be of any configuration suitable for generating data regarding the liquid pressure within applicator 18'.

Sensor circuitry 30 is integrated into parameter sensor 28' and operatively connected to flow meter 32 and pressure sensor 34. Sensor circuitry 30 can be of any suitable configuration for controlling operation of parameter sensor 28', gathering data, processing data, etc. Sensor circuitry 30 can be operatively connected to one or both of flow meter 32 and pressure sensor 34.

Sensor circuitry 30 is configured to receive flow data from flow meter 32 and communicate the flow data to the controller. Sensor circuitry 30 generates flow rate information based on the flow data. For example, sensor circuitry 30 can be operatively connected to a rotation sensor, such as rotation sensor 116 (FIGS. 4A-4B), to receive flow data from the rotation sensor. Sensor circuitry 30 can generate a rotation count for ball 76 over time. In some examples, sensor circuitry 30 determines the flow rate based on the rotation count and communicates the flow rate to the controller. In some examples, sensor circuitry 30 communicates the rotation count, or other flow data, to the controller and the controller can determine the flow rate.

Sensor circuitry 30 is configured to receive pressure data from pressure sensor 34 and communicate the pressure data to the controller. Sensor circuitry 30 can generate pressure level information based on the pressure data. For example, sensor circuitry 30 can be operatively connected to sensor component 90 to receive pressure data, in the form of a voltage, from pressure sensor 34. Diaphragm 88 flexes and exerts force on the responsive component, which causes a response by the component. It is understood that pressure sensor 34 can be configured as a piezo-resistive sensor, a piezoelectric sensor, or be of any other type suitable or sensing the applicator pressure. Sensor circuitry 30 receives the output from pressure sensor 34 and can provide that pressure data to the controller. In some examples, sensor circuitry 30 generates the pressure level information based on the voltage output by pressure sensor 34. Sensor circuitry 30 can communicate that information to the controller and/or to the user.

Sensor circuitry 30 can include communications circuitry configured to facilitate wired or wireless communications with the controller. In one example, the communications circuitry can be configured for wired interfaces. For example, the communications circuitry can include any one or more of a controller area network (CAN), local interface network (LIN), universal asynchronous receiver/transmitter (UART), serial peripheral interface (SPI), among other interfaces. In wireless communications examples, the communications circuitry can facilitate radio frequency (RF) communications and/or can facilitate communications over a network, such as a local area network, wide area network, and/or the Internet. In one example, the communications circuitry can be configured for communication utilizing short-wavelength ultra high frequency (UHF) radio waves in the 2.4 GHz band (2.400-2.525 GHz) (e.g., Bluetooth® communications). In another example, the communications circuitry can be configured for communications utilizing super high frequency (SHF) radio waves in the 5 GHz band.

During operation, the boom on which applicator 18' is mounted is pressurized with the spray liquid. The spray liquid enters body 40 via inlet port 44. Valve 26 is initially maintained in a closed state such that valve 26 prevents the spray liquid from flowing downstream through valve 26 to turrets 96 and parameter sensor 28'. The controller provides a spray command to valve 26 to cause valve 26 to reciprocate according to a frequency and duty cycle. While applicator 18' is described as including an actively-controlled valve 26, it is understood that applicator 18' may not include a valve or may include a passive pressure-actuated check valve. Parameter sensor 28' provides flow and pressure sensing capabilities regardless of the inclusion of a valve.

Valve 26 pulses open and closed as commanded by the spray command from the controller. The liquid flows to valve 26, passes by valve 26 when valve 26 is in the open state, and flows downstream through body 40 to turrets 96. The liquid enters the turret 96 positioned to receive the liquid and flows to flow meter 32. The liquid flows through turret 96 and enters first end 68'. Splines 78 and cone 106 create helical flowpaths through flow meter 32. The helical flowpaths cause the fluid flow to swirl around axis B-B. The swirling flow drives rotation of ball 76 about axis B-B. As previously discussed, rotation of ball 76 can be detected in any desired manner, such as by a proximity sensor, such as a Hall-effect sensor, or by a photodiode, among other options. The flow rate of the liquid can be determined based on the rotational period of ball 76.

Sensor circuitry 30 determines the flow rate based on the flow data generated by flow meter 32. Sensor circuitry 30 can, in some examples, provide the flow information to the user and/or determine a status of applicator 18' based on the data. In some examples, sensor circuitry 30 can store the flow information or communicate the information to the controller for later use, such as for tracking material use and spray jobs. The controller can control operation of valve 26 based on the data generated by parameter sensor 28'. If the flow data indicates that the flow rate is below the required rate, then the controller commands an increase in the duty cycle percentage of valve 26. If the flow data indicates that the flow rate is above the required rate, then the controller commands a decrease in the duty cycle percentage of valve 26. In some examples, sensor circuitry 30 and/or the controller can generate an alert based on the flow data being outside of an expected range. For example, an unexpectedly high flow rate can indicate that the spray orifice is worn and requires replacement.

The liquid exits flow meter 32 through ports 110 in central member 74'. The liquid flows downstream through sensor housing 62' and to spray tip 100. The liquid exits applicator 18' through the orifice formed in spray tip 100, which generates a liquid spray. Pressure sensor 34 is operatively connected to a portion of the flowpath through parameter sensor 28' downstream of meter body 102. It is understood, however, that pressure port 72 can be disposed on either the upstream or downstream sides of meter body 102.

Pressure sensor 34 generates pressure data based on the liquid pressure. The liquid pressure causes diaphragm 88 to flex. Components within sensor component 90, such as a piezo-resistive component or a piezoelectric component, experience a force due to displacement of diaphragm 88. The force causes a reaction by sensor component 90 causing pressure sensor 34 to generate pressure data based on the reaction. Increases in pressure increase the flexing of diaphragm 88 thereby increasing the force exerted by diaphragm 88. Decreases in pressure decrease the flexing of diaphragm 88 thereby decreasing the force exerted by diaphragm 88. Sensor circuitry 30 can determine the liquid pressure within applicator 18' based on the pressure data from pressure sensor 34 and can generate pressure information, such as the pressure level, and provide that pressure information and/or pressure data to the user. Sensor circuitry 30 can also be configured to communicate the pressure data to the controller for tracking and later use, among other options.

In some examples, individual parameter sensors 28' are mounted on each turret 96 of applicator 18'. Spray tips 100 having different orifice configurations can be mounted on each parameter sensor 28'. As such, applicator 18' can be configured to provide accurate parameter sensing regardless of the turret 96 currently positioned to generate the liquid spray.

Parameter sensor 28' facilitates retrofitting of existing applicators 18' for precise flow control. First end 68' of parameter sensor 28' is configured to mount to turret 96 by interfacing between first features on first end 68' and second features on turret 96. In the example shown, the first features are slots 112 and the second features are projections 114*b*. Second end 70' of parameter sensor 28' is configured to include the second features such that a component having the first features, such as spray tip 100, can mount to parameter sensor 28'. In the example shown, the second features on parameter sensor 28' are projections 114*a*. As such, parameter sensor 28' can be retrofit between turret 96 and spray tip 100.

It is understood, however, that parameter sensor 28' can be integrated with applicator 18' in any desired manner. Parameter sensor 28' can be configured to communicate utilizing existing communications capabilities. For example, parameter sensor 28' can be communicatively coupled to the controller via the bus of an agricultural spraying implement, such as bus 25 (FIG. 1). In some examples, parameter sensor 28' is mounted on applicator 18' that does not include a valve 26. Parameter sensor 28' provides parameter information, such as flow rate and pressure level, for the liquid flow. The information generated by parameter sensor 28' provides accurate monitoring of the liquid flowing through applicator 18'.

Parameter sensor 28' provides significant advantages. Parameter sensor 28' is integrated into applicator 18' and provides accurate pressure and flow information regarding the liquid flow through applicator 18'. Parameter sensor 28' can be readily retrofit onto existing agricultural applicators. Retrofitting parameter sensor 28' onto an existing applicator 18' provides that applicator 18' with flow and pressure sensing capabilities at the applicator-level, thereby facilitating discrete monitoring of the liquid through each applicator 18'. Such discrete monitoring allows the user to detect and address any faults as those faults occur. Such discrete monitoring capabilities prevent both over- and under-application of spray liquids. The precision monitoring provides costs savings, reduces material waste, increases productivity, and provides user confidence, among other benefits. Parameter sensor 28' further provides information for determining the status of applicator 18' throughout operation.

Applicator-level sensing provided by parameter sensor 28' also facilitates individual control of all applicators 18' within a spray system, such as spray system 10 (FIG. 1). Individually controlling each applicator 18' increases the efficiency of the spray operation, prevents material waste, and increases field production due to the more precise and accurate spray application. Valve 26 can be pulsed according to a desired duty cycle to control the flow rate of the liquid such that applicator 18' can emit liquid according to a variety of flow rates, thereby allowing applicator 18' to provide a variety of application rates.

Figure 4:
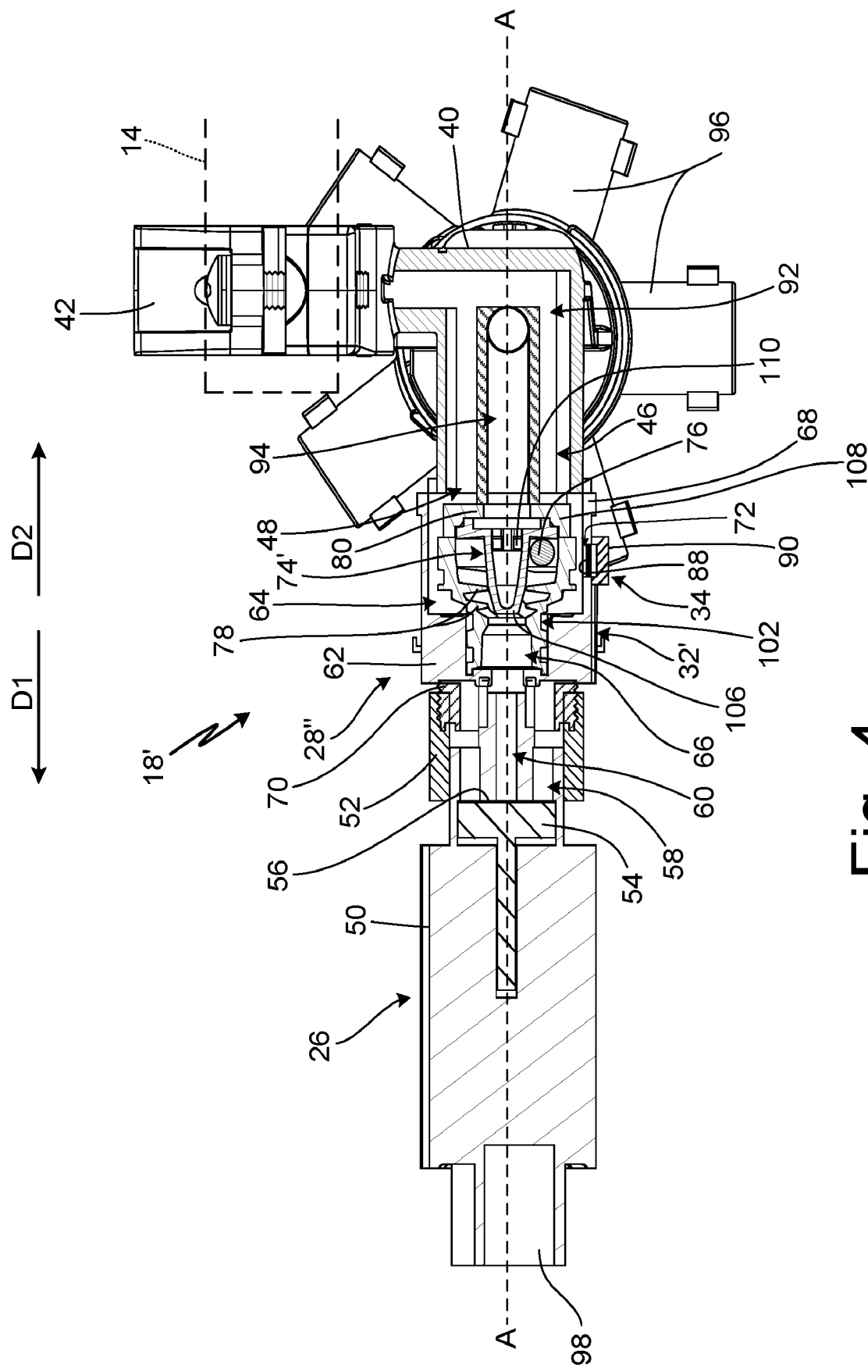
FIG. 4 is a cross-sectional view of a spray applicator.

FIG. 4 is a cross-sectional view of applicator 18'. Applicator 18' is substantially similar to applicator 18 (FIG. 1). Valve 26, parameter sensor 28'', body 40, clamp 42, first flowpath 46, and second flowpath 48 of applicator 18' are shown. Valve 26 includes valve body 50, connector 52, valve member 54, seat 56, valve inlet 58, valve outlet 60, and port 98. Parameter sensor 28 includes flow meter 32, pressure sensor 34, housing 62, first sensor pathway 64, and second sensor pathway 66. Housing 62 includes first end 68, second end 70, and pressure port 72. Flow meter 32' includes central member 74', ball 76, base 80, and meter body 102. Meter body 102 includes splines 78. Central member 74' includes cone 106, flange 108, and ports 110. Pressure sensor 34 includes diaphragm 88 and sensor component 90. Body 40 includes inlet path 92, outlet path 94, and turrets 96.

Applicator 18' is configured to receive liquid from a boom and apply the liquid in a field. In the example show, applicator 18' is a nozzle. Parameter sensor 28'' is generates data regarding the liquid flow through applicator 18'. In some examples, parameter sensor 28'' can generate flow data via flow meter 32', generate pressure data via pressure sensor 34, or generate both flow and pressure data. Parameter sensor 28'' can determine the flow rate and pressure level based on the generated data. For example, parameter sensor 28'' can include sensor circuitry, similar to sensor circuitry 30 (FIGS. 3A-3B), configured to determine the flow rate and pressure level.

In some examples, parameter sensor 28'' can provide the generated data to a controller, and the controller can control operation of applicator 18' based on the data from parameter sensor 28''. The controller can be substantially similar to control module 22 (FIG. 1) and can be operated in accordance with techniques described herein.

First flowpath 46 extends from inlet port 44 to valve 26. In the example shown, first flowpath 46 extends through body 40, parameter sensor 28'', and valve 26, respectively. Second flowpath 48 extends from valve 26 to the spray outlet of applicator 18'. In the example shown, second flowpath 48 extends through valve 26, parameter sensor 28'', and body 40, respectively. The liquid flows in opposite axial directions D1 and D2 through first flowpath 46 and second flowpath 48, respectively. Second flowpath 48 is surrounded by first flowpath 46, thereby providing a compact arrangement of applicator 18'.

Parameter sensor 28'' is mounted to body 40 and supported by body 40. First end 68 of sensor housing 62 to connected to body 40. Valve 26 is attached to second end 70 of sensor housing 62. As such, valve 26 is connected to applicator 18' via parameter sensor 28. Parameter sensor 28'' and valve 26 form a sensing and control assembly that is cantilevered from body 40. While applicator 18' is described as including valve 26, it is understood that applicator 18' does not need to include valve 26. Parameter sensor 28'' provides parameter sensing capabilities regardless of the inclusion of valve 26. Liquid flows in both directions D1 and D2 through parameter sensor 28.

Flow meter 32 is configured to generate flow data regarding the liquid in applicator 18'. Pressure sensor 34 is configured to generate pressure data regarding the liquid in applicator 18'. Meter body 102 is disposed within sensor housing 62 and separates first sensor pathway 64 and second sensor pathway 66. First sensor pathway 64 extends through parameter sensor 28 from first end 68 to second end 70. First sensor pathway 64 forms a portion of first flowpath 46. Second sensor pathway 66 extends through parameter sensor 28 from second end 70 to first end 68. Second sensor pathway 64 forms a portion of second flowpath 48. First sensor pathway 64 and second sensor pathway 66 are coaxially disposed. First sensor pathway 64 and second sensor pathway 66 being coaxial facilitates a compact configuration of parameter sensor 28. The liquid initially flows in direction D1 through first sensor pathway 64 and around meter body 102. The sensing components of flow meter 32', such as ball 76, are disposed within second sensor pathway 66.

Parameter sensor 28'' provides significant advantages. Parameter sensor 28'' is integrated into applicator 18' and provides accurate pressure and flow information regarding the liquid flow through applicator 18'. Applicator-level sensing facilitates discrete monitoring of all applicators 18' within a spray system, such as spray system 10 (FIG. 1). Individually monitoring each applicator 18' increases the efficiency of the spray operation, prevents material waste, and increases field production. Parameter sensor 28'' further facilitates individual control of each applicator 18'. Valve 26 can be pulsed according to a desired duty cycle to control the flow rate of the liquid based on the parameter information generated by parameter sensor 28''. As such, applicator 18' can emit liquid according to a variety of flow rates, thereby allowing applicator 18' to provide a variety of application rates.

Figure 5:
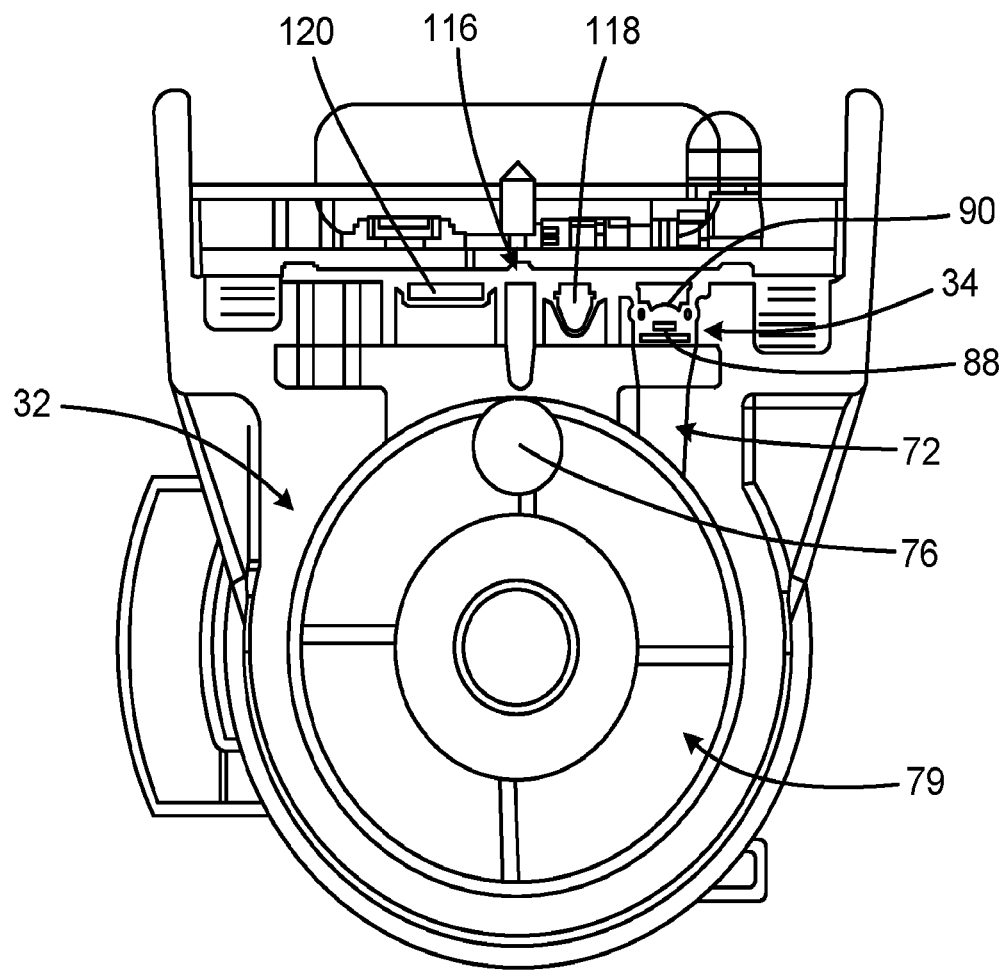
FIG. 5 is a cross-sectional view of a flow meter taken along line 5-5 in FIG. 2B.

FIG. 5 is a cross-sectional view taken along line 5-5 in FIG. 2B showing a portion of parameter sensor 28. Ball 76 is disposed within chamber 79 and the rotational period of ball 76 is detected to determine flow rate. Rotation sensor 116 is configured to detect the rotational period of ball 76. In the example shown, rotation sensor 116 includes emitter 118 and receiver 120. It is understood, however, that flow meter 32 can be configured in any desired manner to detect rotation of ball 76. For example, rotation sensor 116 can include a proximity sensor, such as a Hall-effect sensor, to sense passes of ball 76. Pressure sensor 34 is configured to generate pressure data. Pressure port 72 is in fluid communication with and extends from chamber 79. The sensing components of flow meter 32 (e.g., rotation sensor 116 and ball 76) and pressure sensor 34 (e.g., diaphragm 88) can be aligned in a radial plane extending from axis A-A. Rotation sensor 116 can diaphragm 88 can be aligned circumferentially around axis A-A. Pressure and flow measurements can be taken from the same chamber 79.

FIG. 6A is an isometric view of a portion of flow meter 32'. FIG. 6B is a top plan view of the portion of flow meter shown in FIG. 6A. FIGS. 6A and 6B will be discussed together. Central member 74', ball 76, and rotation sensor 116 of flow meter 32' are shown. Central member 74' includes cone 106, flange 108, and ports 110. Rotation sensor 116 includes emitter 118 and receiver 120.

Flow meter 32' is configured to generate flow data regarding liquid flow through flow meter 32'. It is understood that operation of flow meter 32' is substantially similar to flow meter 32 (FIGS. 2A-2B). As such, the discussion regarding flow meter 32' is equally applicable to flow meter 32.

Projections, such as splines 78 (FIGS. 2B and 3B), extend from a body, such as meter body 102 (FIG. 3B) or sensor housing 62 (FIG. 2B), towards cone 106. The spaces between the projections, body, and cone 106 form helical flowpaths that induce a cyclonic flow through flow meter 32'. The flow direction is indicated by arrow FD. The cyclonic flow drives rotation of ball 76 about axis C-C. Ball 76 is supported by flange 108 of central member 74'. In the example shown, ports 110 extend through central member 74' at the intersection of cone 106 and flange 108. Ports 110 are outlet ports through central member 74' that allow the liquid to exit flow meter 32'.

Rotation sensor 116 is configured to sense ball 76 passing by rotation sensor 116. Rotation sensor 116 generates flow data based on the passage of ball 76. For example, the flow data can include a pass count over a time period. That flow data is utilized to determine the flow rate of liquid through flow meter 32'.

Emitter 118 is disposed adjacent the rotational path of ball 76. Emitter 118 is configured to emit light onto the rotational path of ball 76. Emitter 118 can be of any suitable configuration for emitting light, such as a light emitting diode (LED), laser, or other light source. Receiver 120 is disposed adjacent the rotational path of ball 76. Receiver 120 can be a photodiode or of any other type suitable for sensing the light reflected by ball 76 passing by rotation sensor 116. Receiver 120 senses the passage of ball 76 and provides relevant data to the control circuitry of flow meter 32', such as sensor circuitry 30 (FIGS. 3A-3B). The control circuitry can generate a pass count based on the data from receiver 120 and that pass count is utilized to determine the flow rate.

In some examples, the output of receiver 120 is an input to a trans-impedance amplifier, followed by an analog low pass filter with a predetermined cutoff frequency. These components can be incorporated into flow meter 32' and/or system controller, which can interact. The resulting voltage-based signal is output as an input to system controller, which samples the analog signal with an analog-to-digital (A/D) converter. Signal processing techniques are utilized to determine the fluid flow rate. As an alternative implementation, the output of the trans-impedance amplifier can be utilized as input to a comparator to generate a digital signal the digital signal can provide input to a timer/capture/compare unit on the system controller to measure the time between pulses corresponding to sphere passes by receiver 120.

As discussed above, the pulsed operation of the valve, such as valve 26, causes ball 76 to stop rotating when the valve is in the closed state. When ball 76 stops rotating in front of rotation sensor 116, receiver 120 can generate data indicating that ball 76 passed by rotation sensor 116 multiple times, when ball 76 in fact stopped rotating. In some instances, ball 76 pausing in front of sensor 116 can be interpreted as a long signal, which increases the time interval that leads to a significant drop in the sensed flow rate. Such indication can cause the flow rate to be overestimated or underestimated. The system controller and/or meter circuitry is configured to process the signal output by receiver 120 to detect instances of over- and/or under-counting. Those instances can then be corrected or otherwise accounted for in determining flow rate.

For example, rotation sensor 116 can detect the rate of change of the flow rate by detecting passes of ball 76. Ball 76 pausing in front of rotation sensor 116 can cause rotation sensor 116 to sense a large rate of change. The controller can be configured to filter that data where the rate of change exceeds a threshold. Ball 76 stopping in front of rotation sensor 116 would generate a significant change in the flow rate compared to sampling done both before and after the ball 76 stoppage. That event can then be detected based on the differences between detected rates, based on the rate exceeding or falling below a threshold, or based on any other suitable technique. In some cases, the average time between passes for various flow rates can be determined and stored in a memory of the controller. A threshold can be determined based on those average times.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A parameter sensing module for mounting to an applicator of an agricultural sprayer such that the parameter sensing module is disposed in a flow path between a pressurized boom of the sprayer and an outlet of the applicator, the parameter sensing module comprising:
   a first end configured to mount to the applicator;
   a second end disposed opposite the first end;
   a housing extending between the first end and the second end;
   a flow meter at least partially disposed in the housing, the flow meter comprising a cyclonic flow meter;
   a pressure sensor disposed at a pressure sensor port through the housing; and
   sensor circuitry operatively connected to the flow meter and the pressure sensor, the sensor circuitry configured to receive flow data from the flow meter and determine a flow rate based on the flow data, the sensor circuitry further configured to receive pressure data from the pressure sensor and determine a pressure based on the pressure data.

2. The parameter sensing module of claim 1, wherein the flow meter comprises:

projections extending radially inward relative to the housing towards a central member, wherein the projections and central member define cyclonic flow paths through the flow meter;

a ball disposed proximate the second end, the ball configured to rotate about the central member;

a rotational sensor disposed adjacent a rotational path of the ball, the rotational sensor configured to sense rotations of the ball and generate flow data based on the sensed rotations of the ball.

3. The parameter sensing module of claim 2, wherein the rotational sensor comprises an emitter and a receiver.

4. The parameter sensing module of claim 3, wherein the emitter comprises a light emitting diode and the receiver comprises a photodiode.

5. The parameter sensing module of claim 2, wherein the rotational sensor comprises a proximity sensor.

6. The parameter sensing module of claim 5, wherein the rotational sensor comprises a Hall-effect sensor.

7. The parameter sensing module of claim 2, wherein the flow meter further comprises a meter body disposed in the housing, and wherein the projections extend radially inward from the meter body.

8. The parameter sensing module of claim 2, wherein the flow meter defines:

an outer flowpath extending between an inlet path extending through the applicator, the inlet path configured to receive liquid from the boom; and an inner flowpath surrounded by the outer flowpath and extending to an outlet path through the applicator, the outlet path configured to provide liquid to a turret of the applicator;

wherein the outer flowpath includes the cyclonic flow paths; and wherein the inner flowpath extends through the central member.

9. The parameter sensing module of claim 8, wherein the flow meter is configured to direct liquid in a first axial direction through the outer flowpath and in a second axial direction through the inner flowpath, the first axial direction being opposite the second axial direction.

10. A nozzle for use in an agricultural sprayer, the nozzle comprising:

a nozzle body configured to receive fluid from a pressurized boom;

a spray tip fluidly connected to the nozzle body, the spray tip configured to generate a liquid spray; and a parameter sensing module disposed in a flow path through the nozzle between the boom and the spray tip, the parameter sensing module including a first end;

a second end disposed opposite the first end;

a housing extending between the first end and the second end;

a flow meter at least partially disposed in the housing;

a pressure sensor disposed at a pressure sensor port through the housing; and sensor circuitry operatively connected to the flow meter and the pressure sensor, the sensor circuitry configured to receive flow data from the flow meter and determine a flow rate based on the flow data, the sensor circuitry further configured to receive pressure data from the pressure sensor and determine a pressure based on the pressure data.

11. The nozzle of claim 10, further comprising:

a pulse width modulated (PWM) valve supported by the nozzle body and disposed in the flow path, the PWM valve configured to pulse between an open state and a closed state.

12. The nozzle of claim 10, further comprising:

a controller operatively connected to the parameter sensing module, wherein the controller is configured to receive parameter information generated by parameter sensing module and to communicate that parameter information to a user interface.

13. The nozzle of claim 12, wherein the controller is configured to control a duty cycle of a pulse width modulated (PWM) valve supported by the nozzle body and disposed in the flow path based on the parameter value.

14. The nozzle of claim 12, wherein the controller is configured to determine a nozzle status based on the parameter value.

* * * * *